US007318095B2

(12) United States Patent
Husain et al.

(10) Patent No.: US 7,318,095 B2
(45) Date of Patent: Jan. 8, 2008

(54) DATA FAIL-OVER FOR A MULTI-COMPUTER SYSTEM

(75) Inventors: Syed Mohammad Amir Husain, Austin, TX (US); Todd John Enright, Austin, TX (US); Barry W. Thornton, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 1140 days.

(21) Appl. No.: 10/301,536

(22) Filed: Nov. 21, 2002

(65) Prior Publication Data

US 2003/0120772 A1    Jun. 26, 2003

Related U.S. Application Data

(60) Provisional application No. 60/411,066, filed on Sep. 16, 2002, provisional application No. 60/332,143, filed on Nov. 21, 2001.

(51) Int. Cl.
*G06F 15/173* (2006.01)
(52) U.S. Cl. .................. 709/224; 709/220; 709/227; 709/229
(58) Field of Classification Search .......... 709/220, 709/224, 227, 229
See application file for complete search history.

(56) References Cited

U.S. PATENT DOCUMENTS 5,852,724 A * 12/1998 Glenn et al. .............. 709/229
6,195,680 B1 * 2/2001 Goldszmidt et al. ........ 709/203
6,263,368 B1 * 7/2001 Martin ....................... 709/224
6,389,420 B1 * 5/2002 Vahalia et al. .............. 709/248
6,678,835 B1 * 1/2004 Shah et al. ................. 709/223
6,826,613 B1 * 11/2004 Wang et al. ................ 709/227
6,874,147 B1 * 3/2005 Diamant .................... 709/220
6,891,839 B2 * 5/2005 Albert et al. ............... 709/220

OTHER PUBLICATIONS http://research.microsoft.com/-gray/talks/UNIFORM FT.ppt, 5 pages, Date unknown.

(Continued)

*Primary Examiner*—Phuoc Nguyen
(74) *Attorney, Agent, or Firm*—Meyertons Hood Kivlin Kowert & Goetzel, P.C.; Jeffrey C. Hood; Mark S. Williams

(57) ABSTRACT

System and method for managing data fail-over for a computing system comprising a plurality of computers, e.g., computer blades, coupled through a network. A fail-over condition may indicate a component failure, an imminent failure, and/or a need to modify or replace some aspect of a computer. Computers in the system may back up their information to other computers in the system. If a fail-over condition is detected on a first computer, a replacement computer may be loaded with the information from the first computer, optionally from a backup copy stored on another computer (or distributed across multiple computers), and the first computer's peripheral devices (human interface) switched over to the replacement computer. The method may be used to replace a single computer, swap two computers, and/or perform a cascade move among multiple computers, and may be performed automatically in response to the fail-over condition, or initiated by a system administrator.

36 Claims, 20 Drawing Sheets

OTHER PUBLICATIONS http://download2.citrix.com/ctxlibrary/products/pdf/XPs_prodbrief.pdf, Citrix MetaFrameXP's for Windows with Feature Release 2, 2 pgs, 2002.

http://www.storagesearch.com/timesnsys.html, Times N Systems, 1 pg, Jun. 25, 2001.

http://www.microsoft.com/windows2000/en/server/help/default.asp?url=/windows2000/en/server/help/sag_termsrv_topnode.htm, 22 pgs., Feb. 28, 2002.

* cited by examiner

DATA FAIL-OVER FOR A MULTI-COMPUTER SYSTEM

PRIORITY CLAIM

This application claims benefit of priority of provisional application Ser. No. 60/332,143 titled "A Fail Forward Networked Storage System" filed on Nov. 21, 2001, whose inventor is Barry Thornton.

This application also claims benefit of priority of provisional application Ser. No. 60/411,066 titled "Distributed Computing Infrastructure" filed on Sep. 16, 2002, whose inventors are Amir Husain, Todd Enright, and Barry Thornton.

BACKGROUND OF THE INVENTION

1. Field of the Invention

The present invention relates generally to managing information storage between two or more computers and specifically to remedying computer fail-over conditions.

2. Description of the Related Art

Many commercial businesses and enterprises make extensive use of personal computers (PCs) in their daily operations. Typically, each user of a PC in the enterprise has a networked PC at his/her desk or work area. As the number of networked computer systems utilized in an enterprise increases, the management of resources in the network may become increasingly complex and expensive. Some of the manageability issues involved in maintaining a large number of networked computer systems may include ease of installation and deployment, the topology and physical logistics of the network, asset management, scalability (the cost and effort involved in increasing the number of units), troubleshooting network or unit problems, support costs, software tracking and management, as well as the simple issue of physical space, be it floor space or room on the desktop, as well as security issues regarding physical assets, information protection, software control, and computer virus issues.

Many of these issues may be addressed by centralizing the locations of the PCs, such as by installing multiple PCs into a central frame or cabinet, and locating each PC's human interface (e.g., keyboard, monitor, mouse, etc.) at a respective remote location, e.g., more than 10 or 20 feet from the computing system. In one approach, each computer in the system may be a "computer on a card", also referred to as a computer blade or "blade". In other words, the computing system may be comprised on a circuit card which may include standard computing system components such as a CPU, memory, power supply, and network interface, as well as an extender, e.g., a PCI extender, for communicating with the remote human interface. In a typical networked computer system, the hard drive is often one of the least reliable components. Due to the constant use of the hard drive, and the reliance of the user on the information and application programs stored on the hard drive, a failure of the hard drive may have catastrophic effects. Additionally, when the number of computers and respective hard drives in the networked system becomes very large, the occurrence of a hard drive failure becomes increasingly probable, i.e., the mean time between failures decreases as the number of drives in the system increases.

Information redundancy is generally used to prevent irretrievable loss of information in the event of a hard drive or computer failure. For example, a variety of approaches may be based on the Redundant Array of Inexpensive Disks (RAID), where information on one disk drive are replicated on other disk drives so that in the event of a failure the information of the original drive may be rebuilt or restored from the other disk drives. However, these systems typically rely on central storage management, such as a dedicated server computer that monitors and controls the storage, backup, and retrieval process among the networked computers. Thus, there are particular points of failure that may lead to catastrophic losses of information or functionality in the system. In many cases, there may even be a single point of failure, such as the managing server, whose failure may jeopardize the entire system.

Thus, improved systems and methods for managing information storage between a plurality of computers are desired.

SUMMARY OF THE INVENTION

Various embodiments of a system and method for managing data storage for a plurality of computer systems are presented. In one embodiment, the computer systems may be configured to restore or replace a failed computer system. The computer systems may include a first computer, having a first processor and a first storage medium coupled to the first processor, and a peripheral device, e.g., a keyboard, monitor, mouse, or other type of peripheral device. The computer systems may further include a second computer having a second processor and a second storage medium coupled to the second processor. in one embodiment, the first computer and the second computer may each be configured on a respective computer blade, also referred to as a "computer on a card." A communication link, e.g., a bus, may couple the first computer to the second computer. A peripheral switch may be coupled to the first computer, the second computer, and the peripheral device. The peripheral switch may be configured to route signals between the peripheral device and the first computer.

In one embodiment, a fail-over condition may be detected on the first computer, e.g., related to the first processor, the first storage medium, or other component of the first computer. Note that as used herein, the term "fail-over condition" may refer to an impending failure of a component, to the component failure itself, or to a condition of a computer that requires attention. A computer that indicates a fail-over condition may be referred to as a "failed" computer, even if an actual component failure has not occurred. Thus, detection of a fail-over condition may occur before an actual failure, or may occur during or after the failure (detection of the fail-over condition). For example, a fail-over condition may indicate failure of a processor, impending failure of a processor, or even that the performance, e.g., the processing capability, of the computer needs to be upgraded or modified. Once the fail-over condition has been detected, then various actions may be taken to restore, replace, or improve, functionality of the failed computer, e.g., by switching the user (i.e., the user's interface) to a replacement computer, where the replacement computer has a copy of at least a portion of the contents of the first computer's storage medium, i.e., the first computer's information (which may include programs). In various embodiments, the information may be copied to the replacement computer prior to, during, and/or after, the detection of the fail-over condition. Additionally, in different embodiments, the information may be copied directly from the first computer to the replacement computer, or may be copied from the first computer to one or more other computers, then copied from the one or more other computers to the replacement computer. In one embodiment, the information may be copied to local computers and/or remote computers. If a local backup is available when the first computer has a fail-over condition, the local backup may be accessed faster than a remote backup. If the local backup is not available, the remote backup may be accessed. Finally, in various embodiments, program instructions that implement the detection, copying, and switching may be stored and executed on various of the computers.

For example, in one embodiment, the first storage medium and/or the second storage medium may store program instructions executable by the first processor and/or the second processor to detect a fail-over condition of the first computer and copy information from the first storage medium onto the second storage medium. In another embodiment, the information from the first storage medium may be copied onto a third computer having a third processor and a third storage medium. As noted above, the information may be copied from the first storage medium prior to or after detection of the fail-over condition. Note that in these examples, the second computer is considered to be the replacement computer.

For example, in one embodiment, the first computer may detect a fail-over condition related to one or more of its components, e.g., the first storage medium, where the fail-over condition may indicate that a failure is forthcoming or imminent (i.e., but has not yet occurred). The first computer may then copy the information to the second computer and switch the interface, i.e., the peripheral device, over to the second computer. In an embodiment in which the information of the first computer has already been backed-up (prior to the fail-over condition) to the second computer, the first computer may simply switch the peripheral device over to the second computer. In an embodiment in which the information of the first computer has been backed-up (prior to the fail-over condition) to one or more other computers, e.g., the third computer, the first computer may copy the information from the one or more other computers to the second computer, then switch the peripheral device over to the second computer. In other words, if the information has not already been reconstructed on the storage medium of the second computer, then the first computer may do so before switching over. Of course, in other embodiments, the above operations may be carried out by program instructions executing on the second computer, or alternatively, on the third computer.

Thus, once the information from the first storage medium is on (has been copied to) the second storage medium the information may be accessible by the second processor by accessing the second storage medium. In one embodiment, the second storage medium may store program instructions executable by the second processor to configure the peripheral switch to route signals between the peripheral device and the second computer so that the second processor and the second storage medium may be accessed by the peripheral device. Of course, in other embodiments, the program instructions for switching the peripheral device may be stored and executed by others of the computers, e.g., by the third computer.

In one embodiment, the information originating from the first storage medium may be copied in a snapshot method in which all of the information to be copied is bulk copied at specified refresh times, where refresh times may indicate particular times to refresh (e.g., every hour on the hour, once per day at 3:00 a.m., etc.), or may indicate intervals between successive refreshes. For example, in one embodiment, a refresh time may be an hour such that the information is bulk copied from the first storage medium onto the second and/or third storage medium once per hour.

In one embodiment, a replication factor may be set to determine how many computers the first computer will backup to. The first computer may detect the identities of other computers in the system and be assigned to one or more of them depending on the replication factor. Other methods of assignment may also be within the scope of the invention. In addition, a graphical user interface may be provided to assist an administrator in setting factors such as, but not limited to, the replication factor.

In another embodiment, a delta-based method may be used to copy the information from the first storage medium, where only a difference between a previous copy of the information copied to the second and/or third storage medium and the current information on the first storage medium is added to the second and/or third storage medium. The first computer may keep track of the incremental backups in a catalog. The catalog may then be used by a computer that the first computer is backing up to in order to request missed incremental backups from the first computer.

In one embodiment, each computer may have some file server functionality. The file server functionality may include some I/O functionality, and may also include functionality for negotiating file write and read protocols. Communicating with the storage medium on the computer may be analogous to communicating with a standard file server attached memory. The computer may negotiate information writes similar to a file server, and order and prioritize transactions. In one embodiment, the computer may also implement striping analogous to that used by RAID (Redundant Array of Inexpensive Disks).

In one embodiment, a fail-over condition may include an indication of a need to switch the first computer, e.g., to improve performance for a user, or change environments (e.g., from Microsoft Windows to Apple MacOS). For example, if the second computer is a higher performing computer, and the user of the first computer needs more computational power than the user of the second computer, the computers assigned to each user may be swapped. In other words, the first computer (or another computer) may copy the information from the first computer over to the second computer, and the second computer (or another computer) may copy the information from the second computer onto the first computer. Similarly, a peripheral switch may swap the human interfaces for the respective computers, e.g., by routing signals from a first peripheral device (originally routed to the first computer) to the second computer, and from a second peripheral device (originally routed to the second computer) to the first computer.

In another embodiment, a cascade move may be performed. For example, if a new powerful computer is added to the network, multiple users may be upgraded to computers more powerful than their currently assigned machines, e.g., based on computation needs, seniority, etc., where, for example, user A gets moved to the new computer, user B gets moved to user A's old computer, user C gets moved to user B's old computer, and so on. Thus, in this approach, the information from the first computer (user B's old computer) may be copied to the second computer (user A's old computer) while the information from the second computer (user A's old computer) is copied onto a third computer (the new computer). A peripheral switch may switch the first peripheral (i.e., user B's human interface) over to the second computer and may switch the second peripheral (i.e., user A's human interface) over to the third computer. Other switches may also be within the scope of the invention. For example, in one embodiment, a single peripheral switch may provide switching for all of the human interfaces. Alternatively, there may be a peripheral switch per computer or human interface. In yet another embodiment, the system may include a peripheral switch for each of a number of subsets of the computers/human interfaces.

In one embodiment, the storage mediums on the computers may share memory space using a virtual network storage space (VNAS) system incorporating a decentralized peer-to-peer sharing process. For example, the information from the first computer may be stored on the storage mediums of the second and third computers (and/or others of the plurality of computers). If the first computer indicates a failover condition, a peripheral switch may switch a peripheral device from the first computer over to the second computer. The second computer may access the information for the first computer from the second storage medium and the third storage medium. In other words, the information may be distributed over the second and third computers, but may be accessible as if stored on a single (virtual) storage medium. In one embodiment, the information on the second computer and the third computer may be organized (e.g., copied) onto either the second computer or the third computer to have the information from the first computer collected onto one computer. The peripheral switch may then switch the peripheral device from the first computer over to the computer with the organized copy.

BRIEF DESCRIPTION OF THE DRAWINGS

A better understanding of the present invention may be obtained when the following detailed description of the preferred embodiment is considered in conjunction with the following drawings, in which.

Figure 1:
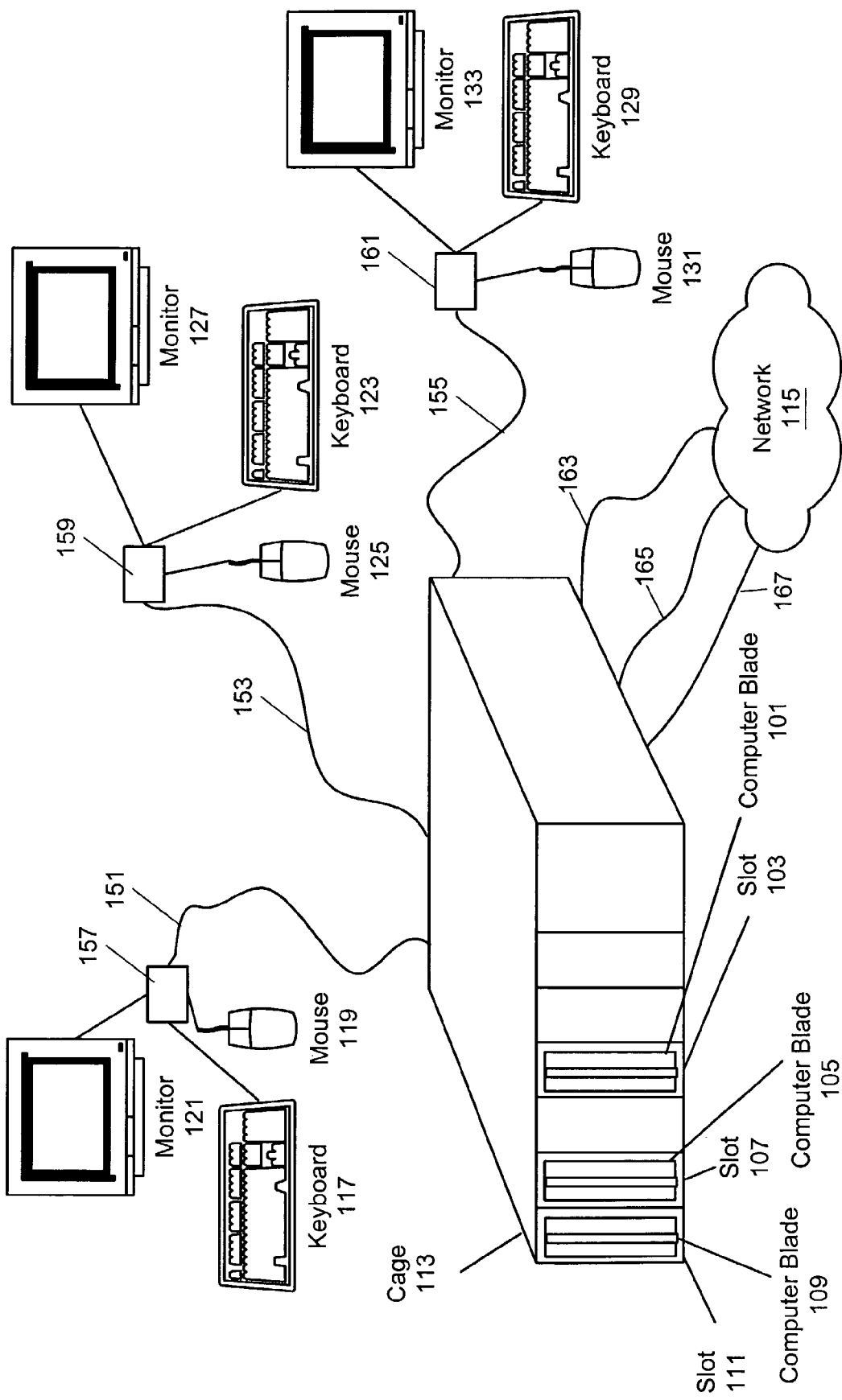
FIG. 1 illustrates computer systems including peripheral devices coupled to computer blades in a cage, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

U.S. Provisional Patent No. 60/144,809 titled "A Technique To Extend The Operating Distance Of A Universal Serial Bus" is hereby incorporated by reference in its entirety as though fully and completely set forth herein.

U.S. Pat. No. 6,119,146 titled "Computer Network Having Multiple Remotely Located Human Interfaces Sharing A Common Computing System", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,038,616 titled "Computer System With Remotely Located Interface Where Signals Are Encoded At The Computer System, Transferred Through A 4-Wire Cable, And Decoded At The Interface", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,012,101 titled "Computer Network Having Commonly Located Computing Systems", which was filed May 4, 1998, whose inventors are Andrew Heller, Barry Thornton, Daniel Barrett, and Charles Ely, is hereby incorporated by reference in its entirety as though fully and completely set forth herein.

U.S. patent application Ser. No. 09/179,809 titled "A Technique To Transfer Multiple Information Streams Over A Wire Or Wireless Medium" is hereby incorporated by reference in its entirety as though fully and completely set forth herein.

U.S. patent application Ser. No. 09/619,989 titled "System And Method For Providing A Remote Universal Serial Bus", which was filed Jul. 20, 2000, whose inventors are Dan Barrett, Mike Barron, and Andrew Heller, is hereby incorporated by reference in its entirety as though fully and completely set forth herein.

U.S. patent application Ser. No. 09/680,760 titled "System And Method For Combining Computer Video And Remote Universal Serial Bus In An Extended Cable", which was filed Oct. 6, 2000, whose inventor is Barry Thornton, is hereby incorporated by reference in its entirety as though fully and completely set forth herein.

U.S. patent application Ser. No. 09/728,667 titled "Computer On A Card With A Remote Human Interface", which was filed Dec. 12, 2000, whose inventors are Andrew Heller and Barry Thornton, is hereby incorporated by reference in its entirety as though fully and completely set forth herein.

U.S. Pat. No. 5,530,960 titled "Disk drive controller accepting first commands for accessing composite drives and second commands for individual diagnostic drive control wherein commands are transparent to each other", which was filed on Jun. 25, 1996, whose inventors are Terry J. Parks, Kenneth L Jeffries, and Craig S. Jones, is hereby incorporated by reference in its entirety as though fully and completely set forth herein.

U.S. Pat. No. 5,483,641 titled "System for scheduling readahead operations if new request is within a proximity of N last read requests wherein N is dependent on independent activities", which was filed on Jan. 9, 1996, whose inventors are Terry J. Parks, Kenneth L Jeffries, and Craig S. Jones, is hereby incorporated by reference in its entirety as though fully and completely set forth herein.

U.S. patent application Ser. No. 09/892,324 titled "Computer System Having a Remotely Located Human Interface Using Computer I/O Bus Extension", which was filed Jun. 25, 2001, whose inventors are Ray DuPont, Mike Tullis, and Barry Thornton, is hereby incorporated by reference in its entirety as though fully and completely set forth herein.

U.S. patent application Ser. No. 09/892,331 titled "System Comprising Multiple Co-Located Computer Systems Each Having a Remotely Located Human Interface Using Computer I/O Bus Extension", which was filed Jun. 25, 2001, whose inventors are Ray DuPont, Mike Tullis, and Barry Thornton, is hereby incorporated by reference in its entirety as though filly and completely set forth herein.

U.S. Provisional Application Ser. No. 60/332,143 titled "A Fail Forward Networked Storage System" filed on Nov. 21, 2001, whose inventor is Barry Thornton, is hereby incorporated by reference in its entirety as though fully and completely set forth herein.

U.S. Provisional Application Ser. No. 60/411,066 titled "Distributed Computing Infrastructure" filed on Sep. 16, 2002, whose inventors are Amir Husain, Todd Enright, and Barry Thornton, is hereby incorporated by reference in its entirety as though fully and completely set forth herein.

U.S. patent application Ser. No. 10/301,518 titled "Distributed Resource Manager" filed on Nov. 21, 2002, whose inventors are Syed Mohammad Amir Husain, Todd John Enright, and Barry W. Thornton, is hereby incorporated by reference in its entirety as though fully and completely set forth herein.

U.S. patent application Ser. No. 10/301,563 titled "System and Method for Providing Virtual Network Attached Storage Using Excess Distributed Storage Capacity" filed on Nov. 21, 2002, whose inventors are Syed Mohammad Amir Husain, Todd John Enright, and Barry W. Thornton, now U.S. Pat. No. 7,139,809, is hereby incorporated by reference in its entirety as though fully and completely set forth herein.

Figure 2:
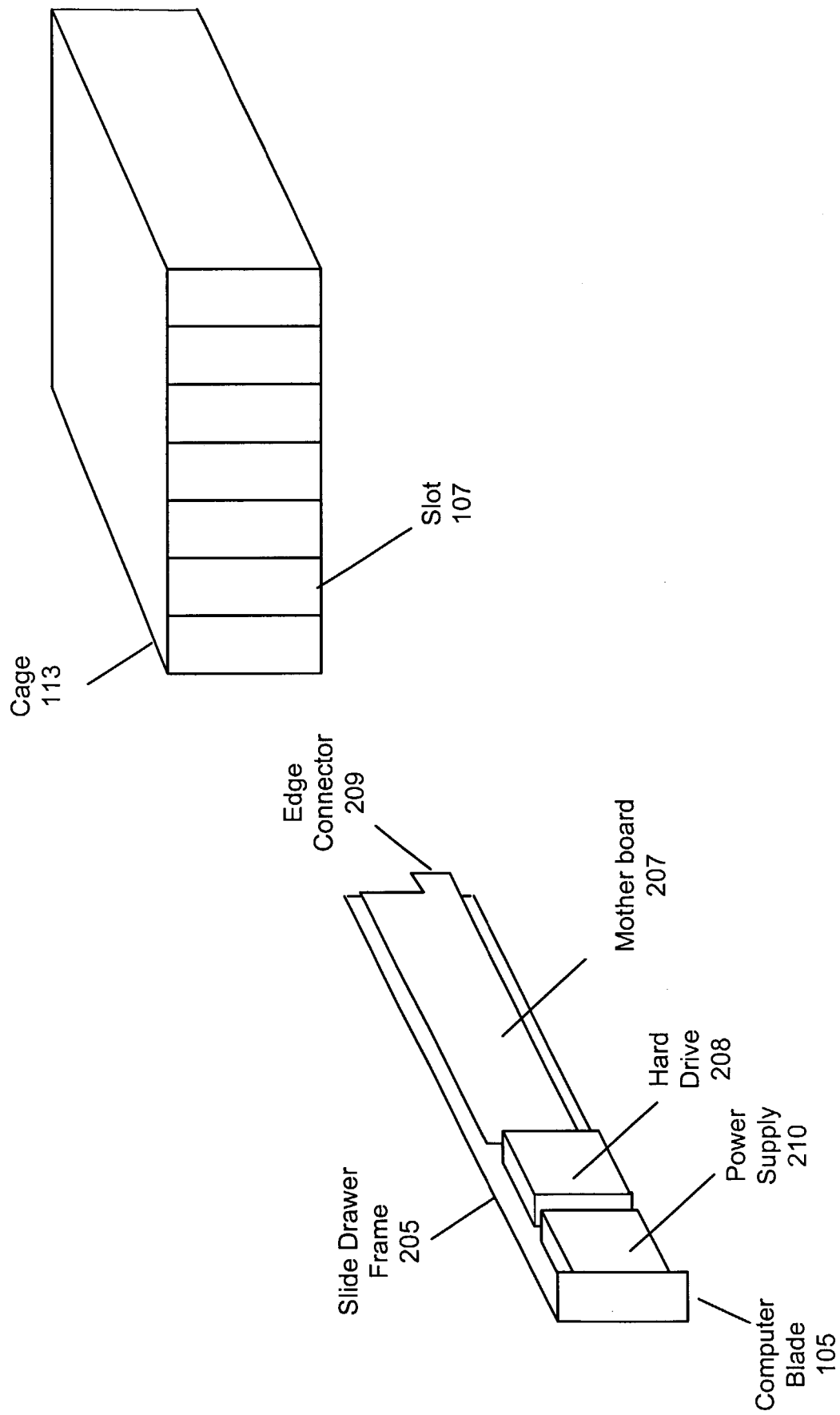
FIG. 2 illustrates a computer blade pulled out of the cage, according to one embodiment.
Figure 3:
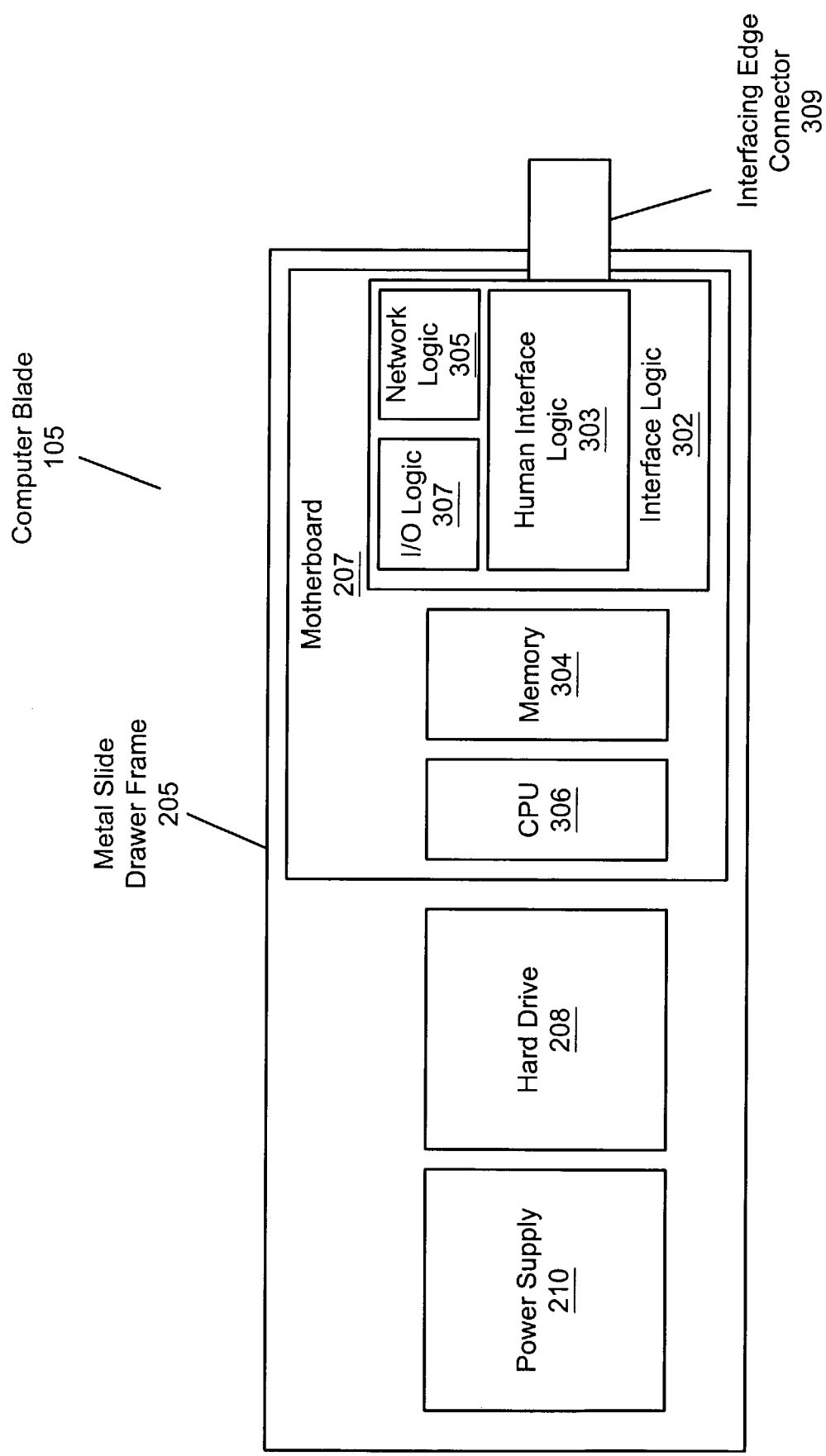
FIG. 3 illustrates a computer blade having a power supply, hard drive, and motherboard, according to one embodiment.

FIG. 1-3—Elements of Computer Systems Used in Various Embodiments

FIGS. 1-3 illustrate computer system components that may be used in various embodiments of the invention. As FIG. 1 indicates, in a preferred embodiment, the system may include a plurality of computer systems, where each computer system may include at least one peripheral device, e.g., comprised in a human interface, and a computer blade. The computer blade may include various components necessary for computer operations, such as, but not limited to, a processor and a storage medium. Other types of computer systems and components may also be within the scope of the invention. For further information regarding the use of multiple computer blades in a system, please see U.S. patent application Ser. No. 09/728,667 titled "Computer On A Card With A Remote Human Interface", which was filed Dec. 12, 2000, whose inventors are Andrew Heller and Barry Thornton, which was incorporated by reference above.

As will be described in detail below, various embodiments of the present invention may be implemented using the systems of FIGS. 1-3, where, for example, substantially all of the information from a first storage medium on a first computer blade may be copied to a second storage medium on a second computer blade before, during, or after a fail-over condition is detected on the first computer blade. Note that as used herein, the term "fail-over condition" may refer to an impending failure of a component, to the component failure itself, or to a condition of a computer that requires attention. A computer that indicates a fail-over condition may be referred to as a "failed" computer, even if an actual component failure has not occurred. Thus, detection of a fail-over condition may occur before an actual failure, or may occur during or after the failure (detection of the fail-over condition). For example, a fail-over condition may indicate failure of a processor, impending failure of a processor, or even that the performance, e.g., the processing capability, of the computer needs to be upgraded or modified. Once the fail-over condition has been detected, then various actions may be taken to restore, replace, or improve, functionality of the computer. A fail-over condition may include, but is not limited to, a hard drive crash or a short circuit in a processor, or indications that such a crash or short circuit is imminent or likely. In one embodiment, software executing on one or more of the computer blades, optionally including the first computer blade, may continually monitor the first computer blade for a fail-over condition. Other ways of detecting a fail-over condition on the first computer blade may also be within the scope of the invention. Once a fail-over condition is detected, a peripheral switch may switch a first computer peripheral device over to a second computer blade. In other words, the peripheral switch may switch the human interface from the first (failing or failed) computer blade to the second (replacement) computer blade.

In various embodiments, the information from the first storage medium may be copied prior to the fail-over condition. For example, the information may be copied directly to the second computer blade, or alternatively, the information may be copied onto a third storage medium on a third computer blade, where after the fail-over condition is detected, the information from the first storage medium (now stored on the third storage medium) may be copied onto the second storage medium of the second computer blade. A peripheral switch may then switch the first computer peripheral device over to the second computer blade, and the user of the first computer system may continue accessing the information from the first storage medium without losing user time. Of course, the peripheral switch may be further operable to switch a plurality of peripheral devices in the human interface, i.e., the number peripheral devices switched is not limited to one. In addition, a peripheral switch may not be needed in an embodiment where a backup component, such as, but not limited to a backup processor or a backup storage medium, is coupled to the first computer prior to or after a fail-over condition is detected in a corresponding component on the first computer. For example, if a processor on the first computer has a fail-over condition, a backup processor may be coupled to the first computer to take the place of the processor on the first computer with a fail-over condition.

FIG. 1—Computer Blades and Respective Peripheral Devices

Referring to FIG. 1, an embodiment of computer systems including peripheral devices coupled to computer blades in a cage is shown. While one embodiment may include computer blades, it is noted that other computer types and forms may also be within the scope of the invention. In other words, the embodiment shown in FIG. 1 is intended to be exemplary only, and is not intended to limit the types or number of computer systems used.

As FIG. 1 shows, connecting cables 151, 153, and 155 may connect computer blades 101, 105, and 109 to respective peripheral device groups through respective device ports or hubs, referred to herein as C-Ports, 157, 159, and 161. In one embodiment, each device port may comprise an extender device that may enable transmission of user interface signals (i.e., peripheral device signals) over distances generally not allowed by standard protocols such as USB. For further information regarding extended communications between a computer and a remote human interface, please see U.S. patent application Ser. No. 09/892,324 titled "Computer System Having a Remotely Located Human Interface Using Computer I/O Bus Extension", which was filed Jun. 25, 2001, and U.S. patent application Ser. No. 09/892,331 titled "System Comprising Multiple Co-Located Computer Systems Each Having a Remotely Located Human Interface Using Computer I/O Bus Extension", both of which were incorporated by reference above.

In one embodiment, the peripheral device groups, such as the peripheral device group coupled to connecting cable 151, may include a keyboard 117, a pointing device, e.g., a mouse 119, a display device, e.g., a computer monitor 121, and/or other peripheral devices for human interface. The computer blade, such as computer blade 105, may communicate with the peripheral devices coupled to the computer blade 105 by sending and receiving encoded human interface signals transmitted over the connecting cable 151. In one embodiment, a cage 113, e.g., a metal cabinet or chassis, may have a plurality of slots, such as slots 103, 107, and 111. The computer blades 101, 105, and 109 may be inserted into the slots 103, 107, and 111, respectively. The cage 113 may also include cage connectors (not shown) to couple the computer blades 101, 105, and 109 to their respective connecting cables 155, 153, and 151.

The computer blades 101, 105, and 109 may be installed in the cage 113 at a central location, while the peripheral devices for each computer blade 101, 105, and 109 may be located remotely from the cage 113, such as at respective work areas of the users of the computer blades 101, 105, and 109. The separation of the peripheral device groups from the computer blades 101, 105, and 109 may allow easier software installation across a network, such as but not limited to downloading CD-ROMs, and provide a central location of multiple computers which may simplify both hardware and software maintenance.

Each computer blade 101, 105, and 109 may also be coupled to a network 115 through an on-board network logic (not shown). The network 115 may be a Local Area Network (LAN) or a Wide Area Network (WAN), such as the Internet, although other networks are also contemplated. As mentioned above, in one embodiment, the computer blades 101, 105, and 109 may be inserted into respective slots 103, 107, and 111 of the cage 113, and coupled to respective peripheral device groups through the cage connectors (not shown) and connecting cables 151, 153, and 155. In one embodiment, each computer blade 101, 105, and 109 may also be coupled to the network 115 through the cage connectors (not shown) and a network cable, such as Ethernet cables 163, 165, and 167.

FIG. 2—Computer Blade

Referring to FIG. 2, an embodiment of a computer blade 105 is shown. In one embodiment, the computer blade 105 may include components such as but not limited to a slide drawer frame 205, motherboard 207, a power supply 210, and a hard drive 208, as shown. In one embodiment, the motherboard 207, the power supply 210, and the hard drive 208 may be coupled to the slide drawer frame 205. In one embodiment, the slide drawer frame 205 may be three rack units high (or approximately 5.25 inches) to occupy a much smaller space than standard PC units, although other slide drawer frame 205 dimensions may also be within the scope of the invention.

The motherboard 207 may be a printed circuit board with components such as but not limited to a central processing unit (CPU), memory, and LAN interface. Other types of motherboards and other types of motherboard components are also contemplated. The hard drive 208 may be a non-volatile memory such as but not limited to a hard drive, optical drive, and/or flash memory. The computer blade 105 may communicate with external systems such as but not limited to peripheral devices and networks, through an edge connector 209. In one embodiment, the edge connector 209 may transmit signals such as but not limited to network signals, input/output (I/O) signals, video signals, audio signals, and universal serial bus (USB) signals. For example, the edge connector may communicate network signals to a network and encoded human interface signals to a group of peripheral devices.

In one embodiment, the computer blade 105 may further include power supply 210 mounted on the slide drawer frame 205 with an internal power source or coupled to an external power source (not shown) to provide power to the computer blade 105. The power supply 210 may convert local main power to an appropriate voltage for the computer blade 105. Because computer blade 105 has an individual power supply 210, if the power supply 210 fails, computer blade 105 may be the only computer blade that fails. In one embodiment, a single power supply located in the cage 113 (shown in FIG. 1) may supply power to several computer blades such as computer blades 101, 105, and 109 (shown in FIG. 1). However, a single power supply for the cage 113 (shown in FIG. 1) may be a single point of failure for the cage 113. If the single power supply fails, multiple computer blades may also fail, requiring multiple replacement blades. In a system with a single power supply for a cage 113, the computer blades 101, 105, and 109 may all require stand-by replacement blades connected to another power source. If the power supply for the cage 113 fails, information from the computer blades 101, 105, and 109 may be copied onto the replacement computer blades from other computer blades in the system to which information from the computer blades 101, 105, and 109 had been previously copied.

As FIG. 2 also illustrates, in one embodiment, cage 113 may have a plurality of slots, such as slot 107, to house the computer blade 105. The computer blade 105 may be inserted into one of the slots of the cage 113, such as slot 107. The cage 113 may include a cage connector (not shown) to couple to the edge connector 209 on the computer blade 105. The cage connector may also include an external second connector (not shown) that is electrically coupled to the computer blade 105 when the computer blade 105 is inserted into the slot 107. The external second connector may be further coupled to the connecting cables 151, 153, and 155 (shown in FIG. 1) for communication of the encoded human interface signals to a group of peripheral devices at a remote location. The use of the cage connectors (not shown) as an intermediate connection between computer blade 105 and the connecting cable 153 (shown in FIG. 1) may allow the removal and exchange of computer blade 105 without the need to disconnect the connecting cable 153 (shown in FIG. 1) from the cage 113. If the computer blade 105 fails, the computer blade 105 may be removed and a new computer blade (not shown) inserted in a slot, e.g., slot 107. As noted above, in a preferred embodiment, when the computer blade 105 fails, the user's human interface, e.g., one or more peripheral devices, may be switched to a replacement computer blade (possibly in a manner that is transparent to the user), after which the failed computer blade may be removed and replaced.

FIG. 3—Computer Blade Components

Referring to FIG. 3, an embodiment of a computer blade 105 having a power supply 210, hard drive 208, and motherboard 207 is shown. The computer blade 105 may include elements that make up a standard PC, such as, but not limited to, a motherboard 207 with various components such as but not limited to a processor, e.g., a CPU 306, memory 304, and interface logic 302, which may include network logic 305, I/O logic 307, and interface logic 303, as well as other interface circuitry associated with a motherboard 207, configured on a single card. The network logic 305 may include a LAN or WAN connection, such as but not limited to a IEEE803.2 (10/100 BaseT) Ethernet, and circuitry for connecting to peripheral devices coupled to the computer blade 105. The computer blade 105 may be electrically coupled to the cage 113 (shown in FIG. 2) through the edge connector 209 that may face to the rear of the computer blade 105. In an embodiment of the invention, the computer blade 105 may slide into a slot 107 (shown in FIG. 2) of the cage 113 (shown in FIG. 2), making contact with the cage connector (not shown).

In one embodiment, the computer blade 105 may further include a network interface logic 305 included on a printed circuit board for interfacing to a network. The network logic 305 may encode network signals into a format suitable for transmission to the network. The network logic 305 may also receive encoded network signals from the network, and decode the encoded network signals. In one embodiment, the motherboard 207 may further include logic supporting PCI slot-based feature cards.

In one embodiment, the components on the computer blade 105 may be arranged from front to back for thermal efficiency. The interface logic 302 may be located at the rear of the computer blade 105, while the power supply 210 and hard disk 208 may be located at the front of the computer blade 105. In one embodiment, the computer blade 105 may have different slide drawer frame shapes, such as but not limited to square, rectangle, cubic, and three-dimensional rectangular forms. In one embodiment, the computer blade 105 may have components mounted on either side of the computer blade 105. The computer blade 105 may also have components mounted on both sides of the computer blade 105. If the slide drawer frame 205 has a three-dimensional shape, the components may be mounted on an inside surface and outside surface of the slide drawer frame 205.

FIGS. 4a, 4b, 4c, and 4d—Computer Blade Storage Patterns

Figure 4A:
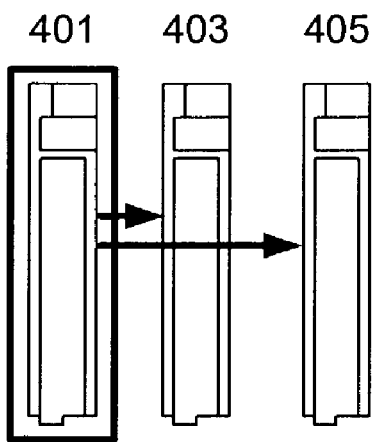
FIGS. 4a, 4b, 4c, and 4d illustrate computer blade storage patterns, according to one embodiment.

Referring to FIGS. 4a, 4b, 4c, and 4d, embodiments of computer blade storage patterns are shown for three computer blades 401, 403, and 405. It is noted that the systems shown in FIGS. 4a, 4b, 4c, and 4d are meant to be exemplary and are not intended to limit the system or method to any particular number of computers. As shown in FIG. 4a, in one embodiment, to prepare for a failure of computer blade 401, the information from a storage medium on the computer blade 401 may be copied (i.e., backed up) onto a storage medium on the computer blade 403. In one embodiment, a first portion of the information on the computer blade 401 may be located in the random access memory (RAM) of the first computer blade 401 and a second portion of the is information may be located on a hard drive of the computer blade 401. Other locations of information from the computer blade 401 may also be within the scope of the invention. If the computer blade 401 fails or indicates a fail-over condition, a peripheral device coupled to the computer blade 401 through a peripheral switch may be switched over to the computer blade 403 through the peripheral switch, thereby enabling a user of computer blade 401 to continue accessing the information (originally) from computer blade 401 (but now on computer blade 403). In one embodiment, the information originating from computer blade 401 (and previously copied onto the storage medium of computer blade 403) may also be copied onto the storage medium of computer blade 405. The peripheral switch may also be operable to switch the peripheral device over to computer blade 405 in the event that both computer blades 401 and 403 fail. In another embodiment, upon detecting a fail-over condition of a processor in the computer blade 401, a backup processor may be switched over to the computer blade 401 to access and run off of the storage medium on the computer blade 401. In another embodiment, if the storage medium on the computer blade 401 fails, information from a backup computer blade may be copied over to a backup storage medium, and the components of the computer blade 401 may access the backup storage medium.

Figure 4B:
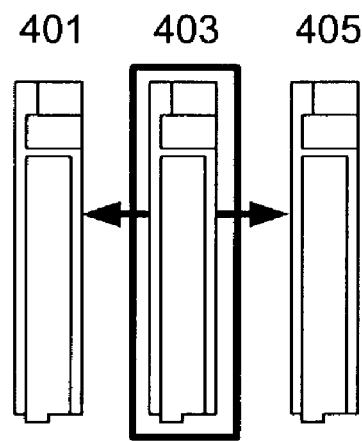
Figure 4C:
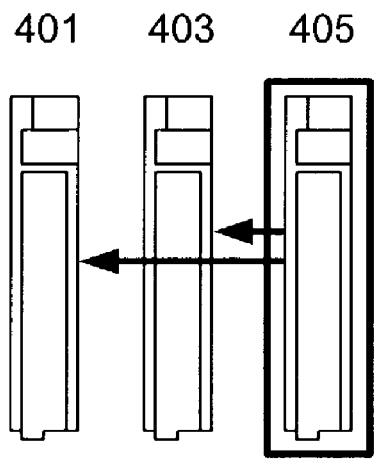

In one embodiment, shown in FIG. 4b, the information on the storage medium of computer blade 403 may be copied onto the storage mediums of computer blade 401 and 405. Similarly, in one embodiment, the information on the storage medium of computer 405 may be copied onto the storage mediums of computer blade 401 and 403, as shown in FIG. 4c. Thus, various of the computer blades may provide backup storage for one another.

In one embodiment, the computer blade 401 may detect and determine identities of one or more local computer blades, such as, but not limited to computer blades 403 and 405, on a subnet. Once detected, the computer blade identities may be stored and cached for later access on the computer blade 401. The detected computer blades to be used in backing up a computer blade may be assigned automatically or manually. In one embodiment, e.g., through an administration interface, computer blades may be assigned to each other at any time. A "replication factor" configuration value, may define how many other computer blades to send copies of the information on the computer blade to be backed up. For example, if computer blades 401, 403, and 405 form a subnet, the computer blade 405 may detect the computer blades 401 and 403 and then choose the computer blade 401 and the computer blade 403 as computer blades to send backups to. If the computer blade 405 has a fail-over condition, either the computer blade 401 or the computer blade 403 may be used to restore information to the computer blade 405, or used to send the information originating from the computer blade 405 to a replacement computer blade.

In one embodiment, the computer blades in one subnet may be backed up to computer blades on another subnet. For example, the computer blades in one subnet may be able to detect the computer blades in another subnet, and then the configuration of which computer blades are used to back up other computer blades between the two subnets may be performed, e.g., by an administrator or automatically. In one embodiment, a web based configuration interface may allow computer blades to be assigned or reassigned to remote computer blades, including blades on other subnets. Computer blades may backup with neighboring computer blades, computer blades in a same building, and/or computer blades in a remote location. In one embodiment, computer blades may be backed up to both geographically local computer blades and geographically remote computer blades. The local computer blades may provide quicker restoration on a replacement computer blade and remote computer blades may provide increased security and reliability.

For example, in one embodiment where information from a first computer blade is backed up onto both a local computer blade and a remote computer blade, if a fail-over condition occurs on the first computer blade, and the local computer blade with the backup is functional, backed up information can be copied to a replacement computer blade from the local computer blade without having to copy information from the remote computer blade. Copying information from the remote computer blade may take longer than from the local computer blade. If multiple computer blades at a site have a fail-over condition, (e.g., if both the first computer blade and the local computer blade with the backup fail) the remote computer blade may have a copy of the information from the first computer blade to copy to a replacement computer blade.

In one embodiment, several local computer blades may backup to a single remote computer blade. The local computer blades may also be backed up to other local computer blades. Having one remote computer blade to backup to may make the remote backups more manageable. The single remote computer blade handling multiple backups may be more powerful than a remote computer blade handling one backup. The remote computer blade may be managed through a web-based management interface. In one embodiment, the web-based management interface may be used by an administrator to schedule snapshots and manage configuration settings.

To optimize bandwidth during backups (especially remote backups), several factors including, but not limited to, the replication factor, the frequency of sending backup information to other computer blades, and the kind of connectivity that exists between the local and remote computer blades may need to be considered.

As mentioned above, in one embodiment, the information on computer blade 401 (and/or from other computer blades) may be backed up in a snapshot method in which all of the information to be copied is bulk copied at specified refresh times, where refresh times may indicate particular times to refresh (e.g., every hour on the hour, once per day at 3:00 a.m., etc.), or may indicate intervals between successive refreshes. For example, in one embodiment, a refresh time may be an hour such that the information is bulk copied from the first storage medium onto the second and/or third storage medium once per hour.

In another embodiment, a delta method may be used to copy the information from the first storage medium, where only a difference between a previous copy of the information copied to the second and/or third storage medium and the current information on the first storage medium is added to the second and/or third storage medium. The delta method may take less time to update but it is conceivable that space required on the storage medium of computer blade 403 may grow to very large proportions because the delta method may keep adding information without removing deleted information. The first time the delta method is used it may function analogously to the snapshot method because the initial copy may encompass all the information from the storage medium on the computer blade 401. In another embodiment, the growth of archived data is automatically managed by the "aging" feature which removes archives or deltas older than a user-defined time period.

In one embodiment, if the computer blade 401 regularly backs up to both the computer blade 403 and the computer blade 405, and the computer blade 405 becomes non-functional, the computer blade 401 may continue to backup to the computer blade 403. If the computer blade 401 is using a delta method, incremental backups on a computer blade may be tagged and archived. If the computer blade 405 becomes functional again, a peersync method may be used to update the last incremental backups from the computer blade 401 to the computer blade 405. For example, if the computer blade 401 backs up information from the computer blade 401 onto the computer blade 405 using a delta method, the computer blade 405 may have missed several incremental backups (i.e. backups covering changes in information on the computer blade 401 since the last backup.) To update the computer blade 405, when the computer blade 405 becomes functional, the computer blade 401 may send the computer blade 405 a catalog of past incremental backups. The computer blade 405 may compare the catalog to the incremental backups the computer blade 405 currently has and then query the computer blade 401 for the incremental backups the computer blade 405 needs to become current. In one embodiment, an archive of the past incremental backups may be sent along with the catalog, and the computer blade 405 may not query the computer blade 401 for the incremental backups. Instead, the computer blade 405 may pull the needed incremental backups from the archive.

In one embodiment, information being written to the storage medium of the computer blade 401 may also be written to the computer blade 403 at substantially the same time. In other words, rather than backing up the information after it has been written to computer blade 401, the information writes may be performed effectively in parallel, or at least in conjunction. If the computer blade 401 fails, the peripheral switch may switch the peripheral device over to the computer blade 403. In one embodiment, the information on the storage medium on computer blade 403 (which may mimic or replicate the information on the storage medium of the failed computer blade 401) may be copied onto the computer blade 405. The peripheral switch may switch the peripheral device from the computer blade 401 over to the computer blade 405. Thus, in this example, although the information of computer blade 401 was backed-up on computer blade 403, computer blade 405 is used as the replacement computer blade, and so the backed-up information is copied to computer blade 405 and the peripheral device switched from the failed computer blade 401 to the replacement computer blade 405.

Figure 4D:
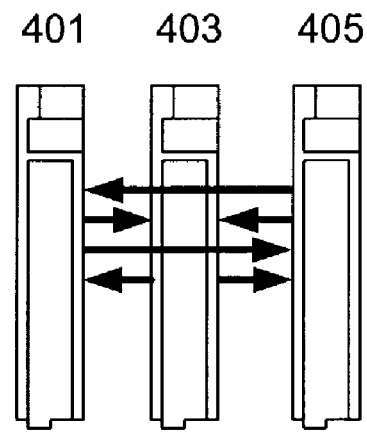

In one embodiment, as shown in FIG. 4d, the hard drives on the computer blades 401, 403, and 405, such as, but not limited to, hard drive 208 shown in FIG. 3) may share memory space using a virtual network storage space (VNAS) system incorporating a decentralized peer-to-peer sharing process. Information stored on the computer blade 401 may also be stored on computer blades 403 and 405. If the computer blade 401 fails, a peripheral switch may switch a peripheral device from computer blade 401 over to computer blade 403. For example, computer blade 403 may then access the information originally stored on or associated with the computer blade 401 from the storage medium of computer blade 403 and the third storage medium of computer blade 405. In other words, the information originally stored on the failed computer blade 401 may be distributed over the computer blades 403 and 405, but may be accessible (to replacement computer blade 403) as if stored on a single (virtual) storage medium. In another embodiment, the (backed-up) information stored on the computer blades 403 and the 405 may be organized (e.g., copied) onto the replacement computer blade 403 to have the information from the failed computer blade 401 collected onto one computer. The peripheral switch may then switch the peripheral device from the first computer over to the computer with the organized or collected copy.

In one embodiment, failure management software may execute to redirect information reads and information writes directed at the failed hard drive to an operating hard drive until a replacement computer or replacement hard drive is brought into service. In one embodiment, the backup copy of the lost information may already be on a replacement disk. As noted above, in a preferred embodiment, the entire process is transparent to the user, i.e., the user may not notice the failure of the computer blade.

Referring back to FIG. 4a, in one embodiment of a topology for the computer blades 401, 403, and 405, the computer blades 401, 403, and 405 may use failure information backup in a virtual network attached storage (VNAS) system. In one embodiment, the information may exist in multiple locations across the VNAS system composed of computer blades 401, 403, and 405, such that an occurrence of a failed computer blade 403 does not result in the loss of vital information from the failed computer blade 403. Other information backup strategies may also be within the scope of the invention to ensure information redundancy. For example, other RAID (Redundant Array of Inexpensive Disks) levels may be used.

In one embodiment, an underlying distributed computer infrastructure (DCI) may be used to distribute resources among the computer blades. Each computer blade may be assigned a number of "peer" or neighbor computer blades that may be used to backup information from the storage medium of a computer blade. "Peer" computer blades, such as, but not limited to, computer blades 403 and computer blade 405, may be assigned to a nearby computer blade 401. In one embodiment, computer blades may be backed up onto computer blades at a remote location. For example, multiple groups of computer blades at multiple locations may be backed up to a one or more central locations, such as, but not limited to disaster recovery centers, with replacement computer blades. In one embodiment, backups to the disaster recovery center may be scheduled so that multiple groups of computer blades can coordinate their backups. In one embodiment, a disaster recovery system may provide a central location for a group of moving computer blades to use for initialization. For example, several moving field hospitals using computer blades with the same set of programs and user preferences may initialize their computer blades from a central location of computer blades.

Figure 5:
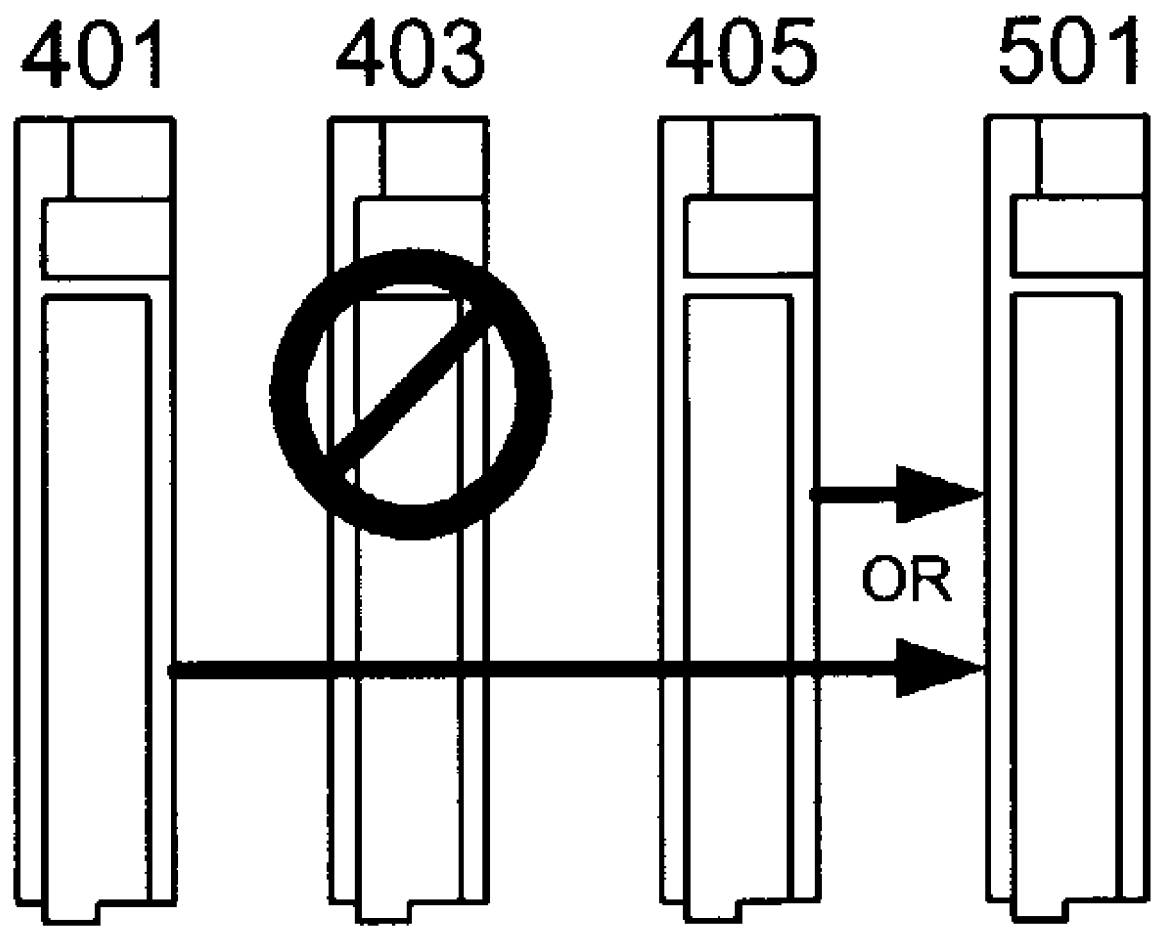
FIG. 5 illustrates a failed computer blade restored onto a backup computer blade, according to one embodiment.

FIG. 5—Restoring a Failed Computer Blade onto a Backup Computer Blade

Referring to FIG. 5, an embodiment of restoring or rebuilding a failed computer blade's functionality (e.g., computer blade 403) onto a backup computer blade (e.g., computer blade 501) is shown. For example, the failed computer blade 403 may have a fail-over condition such as a fatal hard drive crash or a short-circuit on the motherboard 207. In one embodiment, rebuilding a desktop experience (for a user of the failed computer) may include identifying a replacement computer blade 501 to use, switching via the connector cable 153 (shown in FIG. 1) to the user's desktop connector, and loading failed computer blade information from either the first computer blade 401 or (assuming a previous backup to computer blade 405) from third computer blade 405. In one embodiment, the fail-over condition of computer blade 403 may be detected and signaled automatically by computer blade 403, or by computer blades 401 and/or 405. Other signals and other sources may also be within the scope of the invention.

In one embodiment, the information originating from the computer blade 401 (to be copied to another computer blade for backup) may include user preferences. Including the user preferences with the information to be copied to another computer blade 403 may enable a move manager application and/or a switch manager application (or equivalent) to seamlessly provide a replacement computer blade (e.g., computer blade 501) with a similar look, feel, and functionality as a computer blade that has a fail-over condition. The move manager, as discussed below, may implement the transfer of information from one computer blade to another computer blade. The switch manager application may implement switching a first peripheral from a first computer blade to a replacement computer blade.

In one embodiment, the fail-over condition of computer blade 403 may be signaled manually, such as by a user calling a system administrator. In one embodiment, reconnecting a user's peripheral devices, e.g., keyboard 123 (see FIG. 1), mouse 125, and monitor 127, may include identifying replacement computer blade 501, loading the failed computer blade 403 information onto the replacement computer blade 501 from either the first computer blade 401 or the third computer blade 405, and establishing a connection between the user's peripheral devices and the replacement computer blade 501, such as via a soft switch (not shown). In one embodiment, while the information is being restored to the replacement computer blade 501, information reads and information writes from and to the failed computer blade 403 may be diverted to the replacement computer blade 501 so that a user's productivity is not interrupted. In one embodiment, a replacement computer blade 501 may have the standard operating system and applications already stored on it. When a fail-over condition occurs with a user's computer blade, the peripheral device for the user's computer blade may be switched over to the replacement computer blade and the user may begin using the applications already stored on the replacement computer blade. Backup information may be restored to the replacement computer blade in the background, and while the user uses applications already stored on the replacement computer blade, writes the user performs may be diverted to the replacement computer blade.

In one embodiment, information may be copied onto a backup computer after a fail-over condition has been detected. For example, as noted above, first computer 401 may have a first processor and a first storage medium coupled to the first processor. The first storage medium may be a medium including but not limited to a random access memory and a hard disk drive. Second computer 403 may have a second processor and a second storage medium coupled to the second processor. A communication link, e.g., a bus (not shown), may couple the first computer 401 to the second computer 403. In addition, a peripheral switch may be coupled to the first computer 401 and the second computer 403 and may route signals from a human interface, such as but not limited to a first peripheral device coupled to the first computer 401, to the first computer 401 through a peripheral device port coupled to the first computer 401.

In one embodiment, the second storage medium on the second computer 403 may store program instructions executable by the second processor to detect a fail-over condition of the first computer 401 and copy information from the first storage medium onto the second storage medium, thereby making the information accessible by the second processor. Part of or substantially all of the information on the first storage medium may be copied onto the second storage medium. The peripheral switch may be configured to route signals between the first peripheral device and the second computer to make the second processor and the second storage device accessible by the first peripheral device. In one embodiment, copying information from the first storage medium to the second storage medium and routing signals from the first peripheral device to the second processor may occur without user input to trigger the copying and routing, i.e., the data fail-over process may be performed programmatically. Therefore, the copying and re-routing may be transparent to a user of the first computer 401. Thus, in one embodiment, the peripheral switch may switch the signals from the first peripheral device targeted to the first computer 401 over to the second computer 403 without a user input to trigger the switching. In another embodiment, if the first storage medium fails, the first processor may simply access the second storage medium (e.g., of the second computer 403) instead of switching the first peripheral device to the second processor (e.g., the second computer blade 403). In one embodiment, if the first processor has a fail-over condition, but the first storage medium is still functional, the second processor may simply access the first storage medium and the first peripheral switch may be switched over to the second processor.

In one embodiment, the storage medium on the second computer 403 may store program instructions executable by the second processor to copy information from the first storage medium onto the second storage medium to make the information accessible by the second processor before the second processor detects a fail-over condition of the first computer 401. Part of or substantially all of the information on the first storage medium may be copied onto the second storage medium, where the information may be stored (and optionally updated) until a fail-over condition (of the first computer 401) is detected.

In one embodiment, the information may be stored on additional storage mediums, e.g., in case the second computer also has a failure, e.g., a hard disk crash. In one embodiment, the information from the first storage medium may be repeatedly copied onto the second storage medium to keep the information on the second storage medium current with the current state of the first storage medium. For example, in one embodiment, the information on the first storage medium may be copied over the previously copied information from the first storage medium on the second storage medium. In another embodiment, the information from the first storage medium may be initially copied onto the second storage medium, and then subsequent changes to the information on the first storage medium may be stored onto the second storage medium over time. The information on the first storage medium may then be reconstructed using the initial copy stored and the subsequent changes. Periodically, the initial copy and subsequent changes may be overwritten with a new copy of the information on the first storage medium, e.g., to prevent the stored subsequent changes from filling up the second storage medium.

In one embodiment, the first storage medium may also use space on the second storage medium to store information not stored on the first storage medium, e.g., may use the space for purposes other than backup. The first computer 401 may keep a record of the location of the extra information stored on the second storage medium. In one embodiment, the information from the first computer 401 may also be stored on other storage mediums, e.g., on other computers. For example, if the first storage medium is running out of space, it may use space on the second storage medium or other storage mediums to save information to, thus using other computers' storage mediums for overflow. In one embodiment, the information on or originating from the first storage medium may be striped onto other storage mediums. In addition, information from the second storage medium may be copied onto the first storage medium and/or other storage mediums in case the second computer fails or the second computer needs additional space to store its information.

In one embodiment, a third computer 405 including a third processor and a third storage medium coupled to the third processor may also be coupled to the communication link. The third storage medium may store program instructions executable by the third processor to copy (i.e., backup) information from the first storage medium onto the third storage medium. The program instructions may be further executable by the third processor to detect a fail-over condition of the first computer 401, and to copy information from the third storage medium to the second storage medium so that the information is accessible by the second processor. The peripheral switch may then operate to route signals between the first peripheral device and the second processor if the first computer 401 fails.

In another embodiment, the third storage medium may not be comprised in the third computer, e.g., computer 405, but may be coupled to the communication link as a substantially independent networked resource. In this embodiment, the second computer 403 may copy information from the first storage medium (e.g., from the first computer 401) onto the third storage medium. Thus, the second computer 403 may backup information from the first computer 401 onto the third storage medium. After a fail-over condition of the first computer 401 is detected, information from the third storage medium (that was originally on the first computer 401) may be copied to the second storage medium to make the information accessible by the second processor, i.e., by the replacement computer 403. The peripheral switch may then route the signals from the first peripheral device to the second computer 403.

Figure 6:
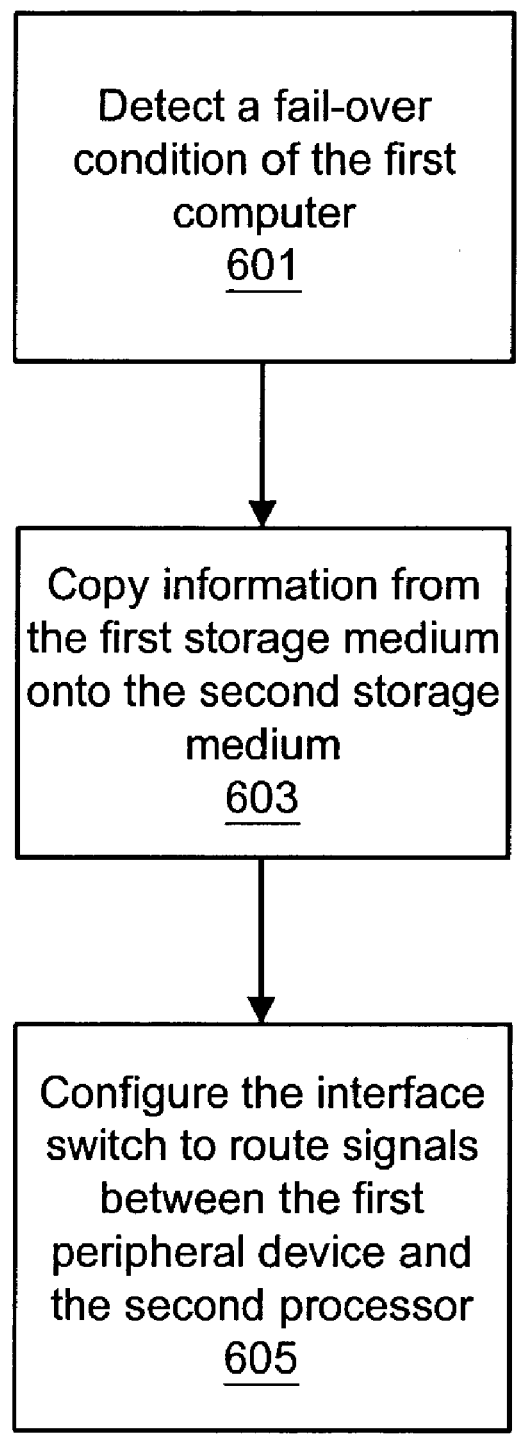
FIG. 6 illustrates an embodiment of a flowchart for restoring a failed computer by copying after a failure is detected.
Figure 7:
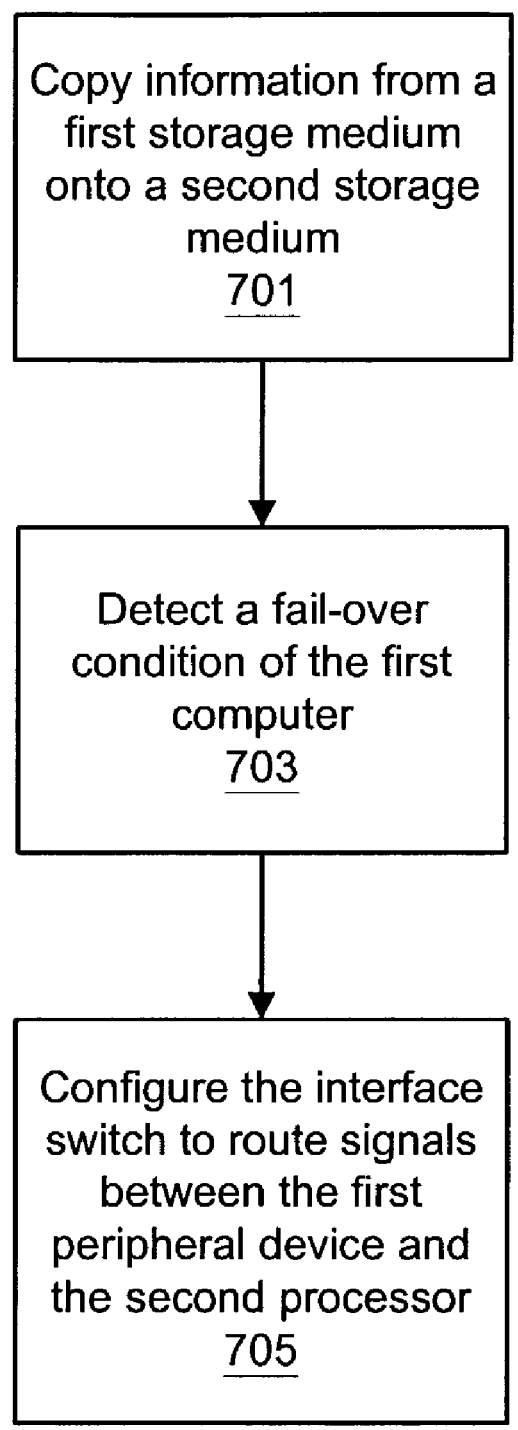
FIG. 7 illustrates an embodiment of a flowchart for restoring a failed computer by copying before a failure is detected.
Figure 8:
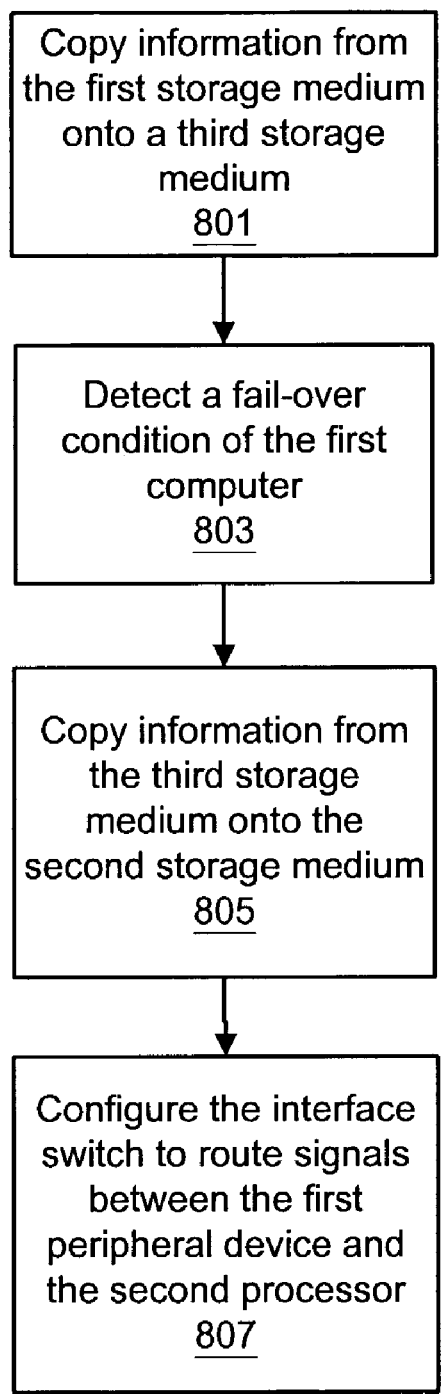
FIG. 8 illustrates an embodiment of a flowchart for restoring a failed computer by copying from a third storage medium.

FIGS. 6-8—Flowcharts of Methods for Responding to a Fail-Over Condition

FIGS. 6 through 8 are flowchart diagrams of various methods for responding to a detected fail-over condition. Various embodiments of the methods described below may be implemented in accordance with any of the systems described above, where a first computer, including a first processor and a first storage medium coupled to the first processor, couples to a first peripheral device via a peripheral switch, where the peripheral switch may be configured to route signals between the first peripheral device and the first computer. A second computer, including a second processor and a second storage medium coupled to the second processor, may be coupled to the first computer via a communication link, as described above. The storage medium of the first and/or the second computer may store program instructions executable by the first and/or second processor to implement various embodiments of the methods described below. As also described above, in some embodiments, other computers, e.g., a third computer, may also perform all or portions of the methods described herein. It should be noted that in various embodiments of the methods described below, one or more of the steps described may be performed concurrently, in a different order than shown, or may be omitted entirely. Other additional steps may also be performed as desired.

As FIG. 6 shows, in 601, a fail-over condition for the first computer may be detected, for example, regarding the first processor or the first storage medium, although the fail-over condition may relate to any other components or subsystems of the first computer. As mentioned above, the fail-over condition may indicate a failure of the respective component, or may indicate that such a failure is likely or imminent, although in this particular embodiment, the fail-over condition does not include an actual failure of the first storage medium, since information is copied therefrom after detection of the fail-over condition. The detection process generally involves some type of monitoring of the first computer. For example, various metrics may be determined that indicate a fail-over condition, such as, for example, read/write error rates, operating temperatures, and so forth, and these metrics may be monitored to detect the fail-over condition. Of course, in various embodiments, the monitoring process may be performed by the first computer itself, or by any other computers coupled to the first computer, as desired.

In 603, information stored on the first storage medium may be copied onto the second storage medium, thereby making the information accessible by the second processor. For example, in a situation where the first processor fails the second computer may access the first storage medium and copy at least a portion of its contents to the second storage medium, after which the second processor, i.e., the second computer, may access the information. As another example, if the fail-over condition is due to an imminent failure of the first storage medium, the second computer may access the first storage medium and attempt to copy the desired portion of its contents to the second storage medium, after which the second processor may access the information, although it is noted that in some cases the storage medium may fail before all of the desired information has been copied.

Finally, once the information has been copied to the second computer, then in 605, the peripheral switch may be configured to route signals between the first peripheral device and the second computer. The first peripheral device may then access the second processor and the second storage medium. It should be noted that although the method described refers to the first peripheral device being switched from the first computer to the second computer, in preferred embodiments, a plurality of peripheral devices, i.e., human interface devices composing a human interface, are coupled to the first computer, and are subsequently switched by the peripheral switch to the second computer. Thus, the peripheral switch may operate to switch the entire human interface of the first computer to the second computer.

Thus, in the embodiment of FIG. 6, the information stored on the first computer may be copied to the replacement computer (i.e., the second computer) after detection of the fail-over condition. It is noted that this approach may make transparency of the process to the user problematic, in that there may be a noticeable delay between the detection of the fail-over condition and resumption of operations using the replacement computer.

In the embodiment shown in FIG. 7, actions are taken prior to detection of the fail-over condition that may significantly improve, i.e., decrease, the time it takes to resume user operations with the replacement computer. In other words, compared to the method of FIG. 6, the expected downtime for the user may be substantially reduced.

As FIG. 7 shows, in 701, information from the first storage medium may be copied onto the second storage medium to make the information from the first storage medium accessible by the second storage processor. In other words, information stored on the first storage medium may be backed-up onto the second storage medium. In various embodiments, this backup operation may be performed by the first computer, by the second computer, or by another computer, e.g., the third computer.

In 703, a fail-over condition may be detected for the first computer, e.g., related to the first processor and/or the first storage medium (or any other component of the first computer). It is noted that in various embodiments, the detection of the fail-over condition may be performed by various of the computers in the system, e.g., by the first, second, and/or third computers.

In response to the detection of the fail-over condition, in 705, the peripheral switch may operate to route signals between the first peripheral device and the second computer. The first peripheral device may then access the second processor and the second storage medium. In other words, the peripheral switch may switch the human interface of the first computer over to the second computer, as described above.

Thus, in the embodiment of FIG. 7, because the information is backed-up to the second computer, i.e., the replacement computer, prior to the fail-over condition, once the fail-over condition for the first computer is detected, the switchover from the first computer to the replacement computer may occur substantially immediately, i.e., with minimum delay. Thus, in this embodiment, transparency to the user of the switchover process may not be difficult to achieve.

In the embodiment shown in FIG. 8, the third computer, including the third processor and third storage medium is coupled to the first and second computers via communication link As shown in FIG. 8, in 801, information from the first storage medium may be copied onto the third storage medium. In other words, information stored on the first storage medium may be backed-up onto the third storage medium. As noted above, in various embodiments, this backup operation may be performed by the first computer, second computer, the third computer, or yet another computer included in the system.

In 803, a fail-over condition may be detected for the first computer, e.g., related to the first processor and/or the first storage medium (or any other component of the first computer). As mentioned above the detection of the fail-over condition may be performed by various of the computers in the system, e.g., by the first, second, and/or third computers (or others).

In response to the detection of the fail-over condition, in 805, the information from the first storage medium may be copied from the third storage medium onto the second computer, i.e., onto the second storage medium, to make the information accessible by the second processor. In other words, the information may be copied from the backup computer (the third computer) to the replacement computer (the second computer).

Finally, in 807, the peripheral switch may be configured to route signals between the first peripheral device and the second computer (the replacement computer). The first peripheral device may then access the second processor and the second storage medium (and may be accessed by the second processor).

Similar to the embodiment of FIG. 7, this embodiment includes backing up the information stored on the first computer (to the third computer) prior to detection of the fail-over condition, and thus may facilitate transparency of the process from the user's perspective.

Resource Manager

Various embodiments of the methods described above with reference to FIGS. 6-8 may be performed by a resource manager. In other words, some or all of the storing, monitoring, detecting, and configuring may be performed or managed by the resource manager. The resource manager may be operable to manage the plurality of computers and associated peripheral devices. In one embodiment, the resource manager may be located on one of the computer blades. In another embodiment, a copy of the resource manager may operate on each of the computer blades, such that a central server may not be needed. In yet another embodiment, the resource manager may be distributed across the plurality of the computer blades and each computer blade may perform a respective portion of the resource manager, such that a central server may not be needed. In each of these embodiments, the resource manager, or resource managers, may operate to schedule efficient information storage among the plurality of computer blades, e.g., computer blades 401, 403, and 405.

In one embodiment, the resource manager may operate to monitor resource usage for each of the plurality of computers. In other words, the resource manager may monitor performance metrics for each computer such as a total memory size, a used memory size, a virtual memory size, peripheral type, available ports, processor type, processor speed, type of installed applications, whether a user is logged in, frequency of logins, percentage of usage of CPU, percentage of usage of hard disks, network hardware installed, network usage, usage of installed applications, video specifications, usage of CD-ROM, a variable imparted by the operating system, and a variable imparted by the BIOS, among others.

In one embodiment, the resource manager may function both as an analyzer and a controller for the system. As an analyzer, the resource manager may utilize information about the performance and use patterns of each of the plurality of computers. Based on the performance and use patterns, the resource manager may compute demand and usage metrics or issues (e.g., processor time, memory usage and demand, hard drive memory, and network information). The resource manager may also generate reports on applications and links used by the system. These patterns may be used to generate a map of the demands on the system's collective resources over time. The continually updated map may be used by the system administrator and/or the resource manager in order to perform predictive and proactive scheduling of resources to users. Other uses of the map may also be within the scope of the invention.

In one embodiment, the resource manager may include or invoke a move manager to move users from their respective current computers to other computers, as described in detail below with reference to FIGS. 7-10.

FIGS. 9-14—Screen Shot Embodiments of Various Interfaces

In one embodiment, software used to manage functions such as, but not limited to, assignment of computer blades to other computer blades for backup, detecting a fail-over condition in a computer blade, and managing the copy process from a backup computer blade to a replacement computer blade, may be installed and managed using a graphical installation program. In one embodiment, installation may be performed by a computer blade local administrator. The installation program may be restricted to administrator access because the installation program may require system resources to which only the administrator may have access. However, other installers are also contemplated. While various embodiments of screens and interfaces are shown, it noted that other screens and interfaces may also be within the scope of the invention.

Figure 9:
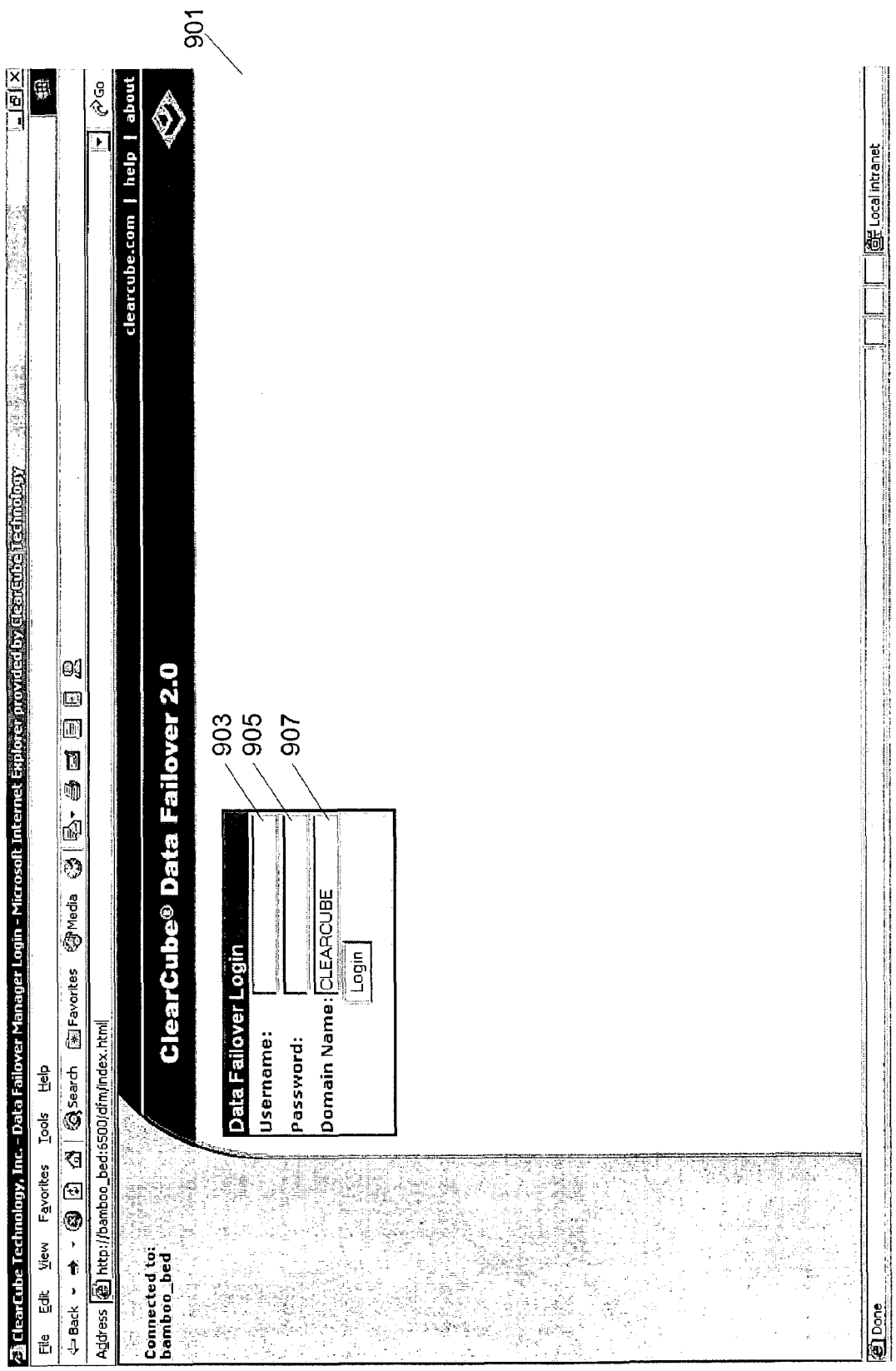
FIG. 9 illustrates a login screen of a management console, according to an embodiment.

FIG. 9—Screen Shot of a Login Screen

FIG. 9 illustrates an embodiment of a login screen 901 of a management console, e.g., a web-based management interface. The login screen 901 may appear before a management session is started. In one embodiment, to enter the management console, a user may need domain administration rights. A login may be validated through a primary domain controller. A username 903 and password 905 may be registered with a network to validate users on the management console. The user may supply a username 903, password 905, and a domain name 907, although other user inputs are also contemplated. Once the username 903, password 905, and domain name 907 are authenticated, the user may be automatically redirected to a management console main menu or screen, described below.

Figure 10:
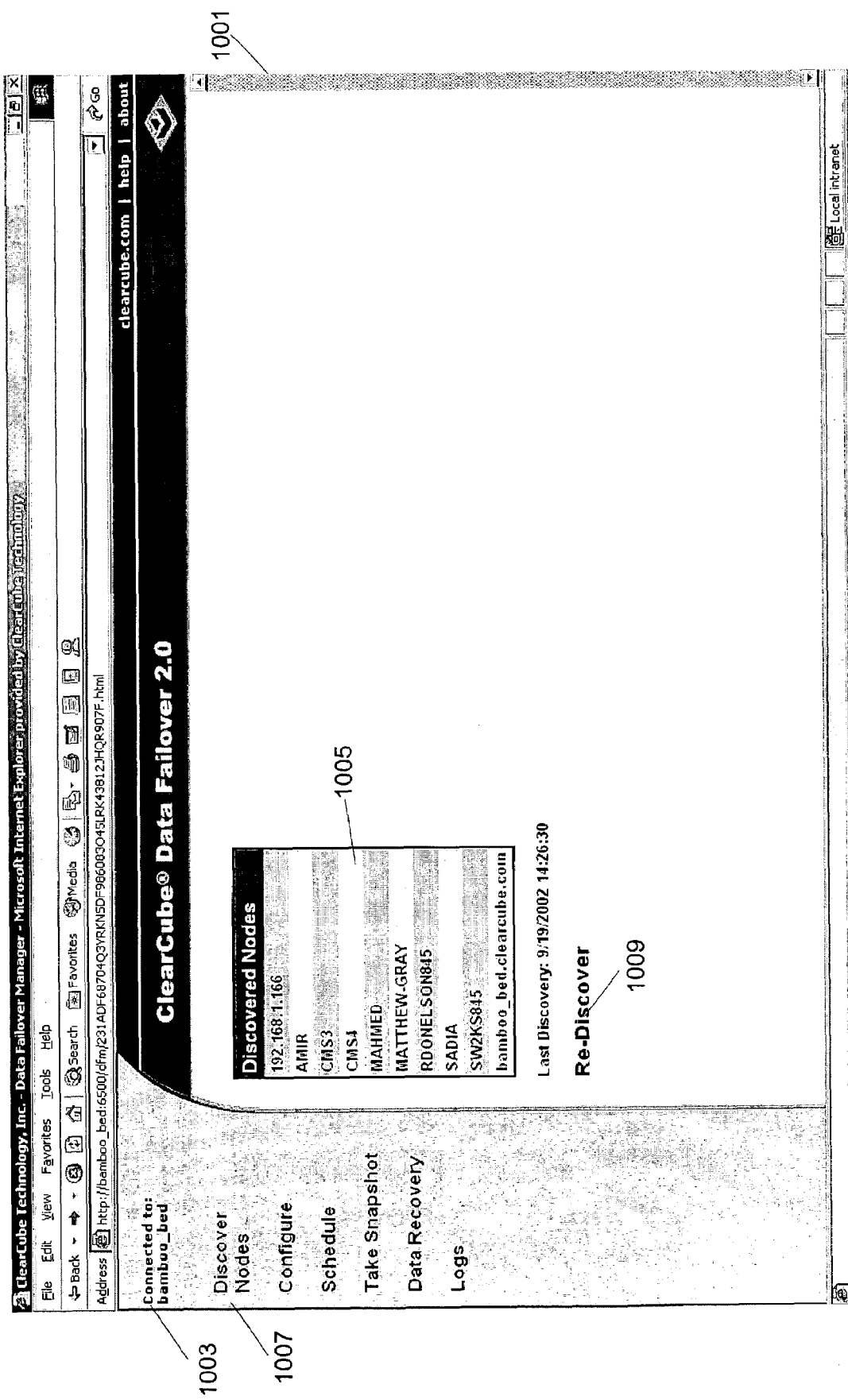
FIG. 10 illustrates a main screen in a web-based management interface, according to an embodiment.

FIG. 10—Screen Shot of an Auto-Discovery Screen

FIG. 10 illustrates an embodiment of a main screen in a web-based management interface such as may be used in various embodiments of the resource manager. For example, the main screen shown FIG. 10 illustrates an auto-discovery screen 1001 showing a list 1005 of computer blades on a local subnet. In one embodiment, clicking on a name of a computer blade may load the management interface with information about that computer blade. In the embodiment shown, an indicator 1003 in the top left hand corner of the main screen displays the name of the computer blade to which the administrator is currently connected (e.g., a computer blade named swlab1). When management software is first installed on a computer blade, the administrator or user may click 'Discover Nodes' 1007, and if no computer blade names appear, the administrator or user may click "Rediscover" 1009 to get a list of computer blade names.

Figure 11:
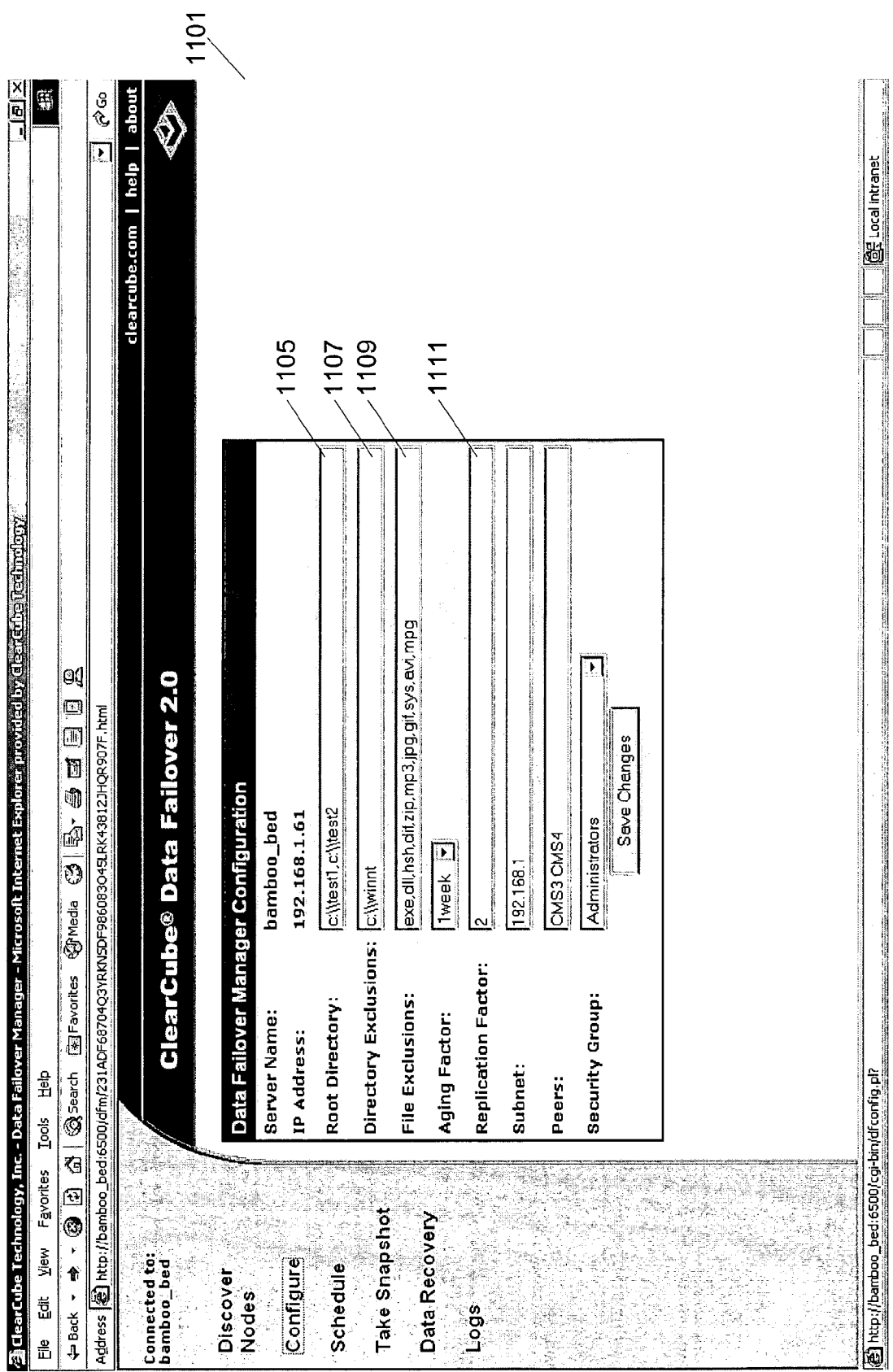
FIG. 11 illustrates a configuration screen, according to an embodiment.

FIG. 11—Screen Shot of a Configuration Screen

FIG. 11 illustrates an embodiment of a configuration screen 1101. In various embodiments, the configuration file for each respective computer may have a standard location on that computer (e.g., the administrator may not need to determine the location of each configuration file on each computer when performing data fail-over). In another embodiment, a parameter indicating a location of a configuration file for a backup computer may be entered by an administrator. In one embodiment, a root directory 1105 may list the location on a storage medium that may be considered as a starting point for a backup process, including, but not limited to, archiving. A subdirectory may be included in the root directory 1105 for the backup process. In a preferred embodiment, an optimum setting for the parameter may point to or indicate the location of preferences file (e.g. a Microsoft™ Windows Documents and Settings) folder to backup user information and preferences for local users of a computer blade. A replication factor 1111 may define how many peers to send local information to and may be used to automatically assign the appropriate number of other computer blades to the local computer blade. A directory exclusion list 1107 may list the names of directories that are not to be included in the backup process, even if they are subdirectories of the root directory. The directory exclusion list 1107 may explicitly exclude system or binary folders that may be unnecessary to backup. File exclusion 1109 may indicate a comma-delimited list of extensions (e.g., .exe, mpg, etc.) that may not be backed up. The comma-delimited list may include .mp3 or other rich media files that may not be important enough to warrant backup.

Figure 12:
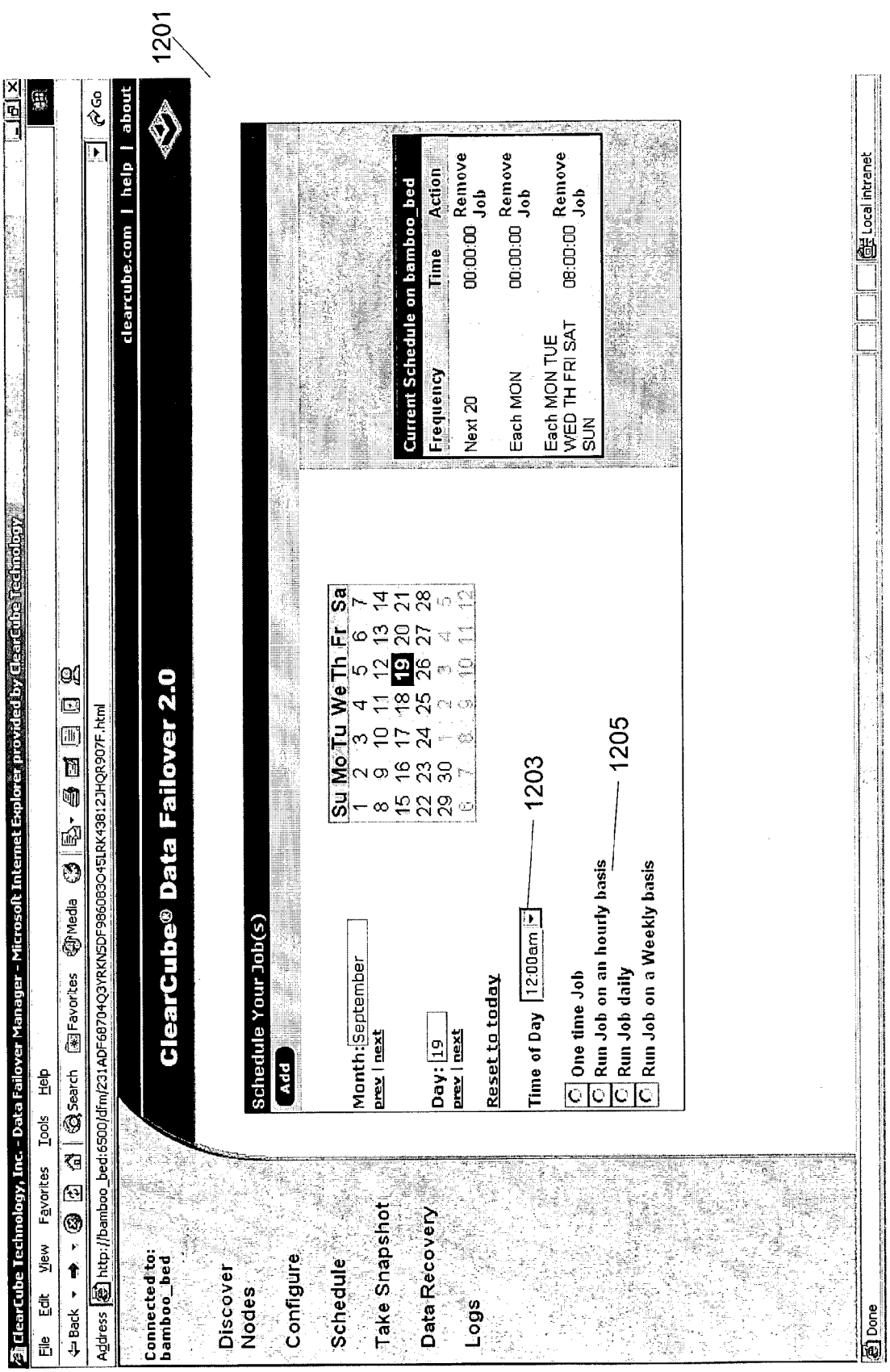
FIG. 12 illustrates a screen for a scheduling interface, according to an embodiment.

FIG. 12—Screen Shot of a Scheduling Interface

FIG. 12 illustrates an embodiment of a screen for a scheduling interface 1201. A time-of-day drop down list 1203 and a frequency selection list 1205 may allow a time and frequency to be scheduled. An added time in the time-of-day drop down list 1203 may be added or removed. In one embodiment, a "weekly" frequency schedule may also be entered. For example, if "6 am, weekly" is entered into the "weekly" frequency, the backup may be taken once a week at 6 am. Frequent backups may cause increased network activity. However, in one embodiment, if a delta method of backup is used, only files changed from the last backup may be archived and sent. In addition, in environments where files are not changing very frequently, very frequent snapshots may not be needed.

Figure 13:
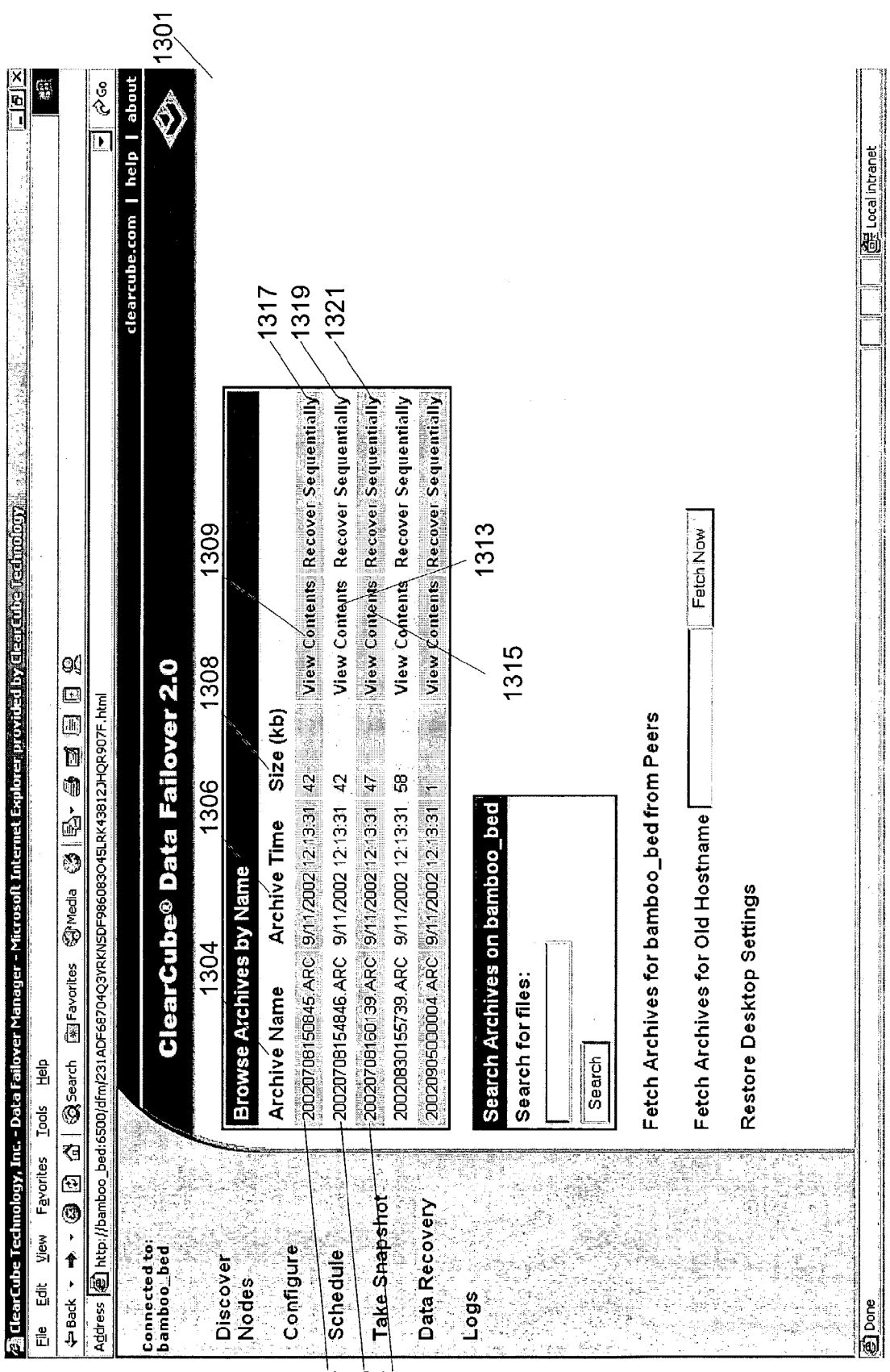
FIG. 13 illustrates an information recovery view, according to an embodiment.

FIG. 13—Screen Shot of an Information Recovery View

FIG. 13 illustrates an embodiment of an information recovery view 1301. In the example shown, three archives, each representing a file or set of files in a backup, may be listed in archive contents listings 1303, 1305, and 1307, along with sizes 1308, names 1304, and time of each archive 1306. In one embodiment, a "View Contents" button 1309, 1313, and 1315 may be placed next to each entry. The "View Contents" button 1309, 1313, and 1315 may be clicked to view contents of each archive. A next button may control sequential restoration. For example, each archive may represent changes between two points in time (e.g., an archive created at 12 p.m. may represent changes that occurred to files between the time of a last backup at 10 p.m. and 12 p.m.). The backups may be used to restore a computer blade to the last archived state of the computer blade, or the backups may be used for controlled rollbacks to earlier versions. The backups may be used for controlled rollbacks if addition of some information to the backup resulted in the corruption of important files or documents.

In one embodiment, when the "Recover Sequentially to this archive" button 1317, 1319, and 1321 is clicked for a particular archive in a backup, the button may cause a restoration of each archive up to and including the selected archive. For example, if archives A, B, C, D, E, and F, are displayed (not shown), clicking on archive D may result in A, B, C and D being restored to a replacement computer blade. However, if there are additional archives, E and F, they will not be restored. The administrator may return to this view and choose further restoration for E, or both E and F. In addition, in one embodiment, the restoration to a replacement computer blade may be non-destructive. In other words, though the restoration may overwrite existing files when their names clash with files present in a restored archive, the restoration may not delete files that do not exist at all in the restored archives. For example, if files X, Y and Z are present in a next archive to restore to a replacement computer blade in a sequential restoration, and prior to restoring the next archive, older versions of X and Y, and a completely different file, W, have already been copied over to the replacement computer blade from previous archives, the restore process may overwrite files X and Y with archived versions of X and Y, may create a new file Z, and may not alter file W.

In one embodiment using VNAS, files may be replicated throughout the network at various storage devices that participate in the VNAS cluster. If one of the underlying VNAS storage devices fails, any requests for data on the failed device may be redirected to a functioning machine having a copy of the requested data. This redirection may be handled in a way that is transparent to the user. Thus, the information recovery view 1301 may be little-used in many circumstances where VNAS is utilized and the replication factor is sufficient to provide adequate copies of data.

Figure 14:
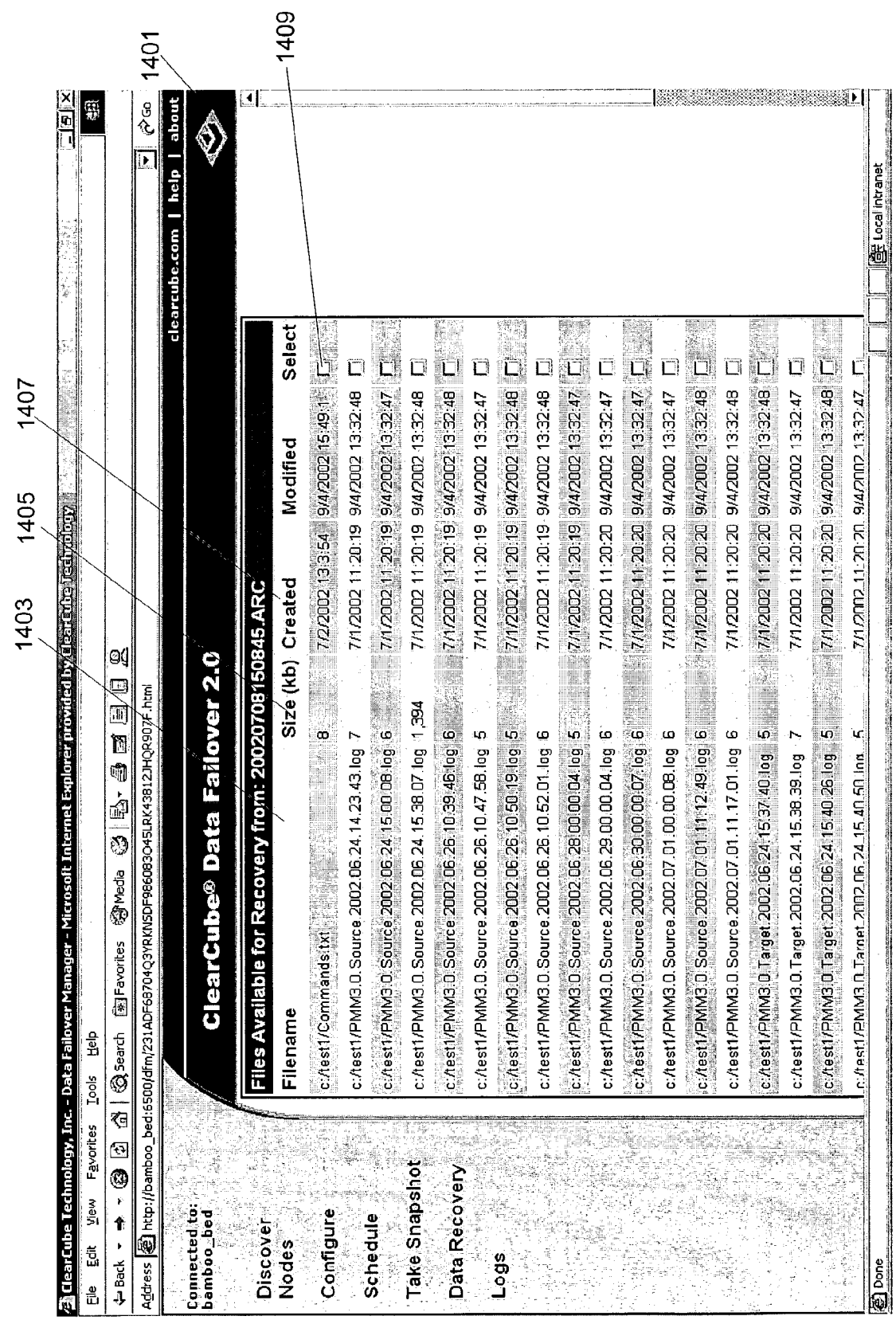
FIG. 14 illustrates an archive view screen, according to an embodiment.

FIG. 14—Screen Shot of an Archive View Screen

FIG. 14 illustrates an embodiment of an archive view screen 1401. In one embodiment, each file 1403, each file size 1405, and each file's date of creation 1407 may be listed. Checkboxes, such as checkbox 1409, may be selected for partial restoration of an archive. Corrupted or accidentally deleted information from backups may be selected and restored.

Figure 15:
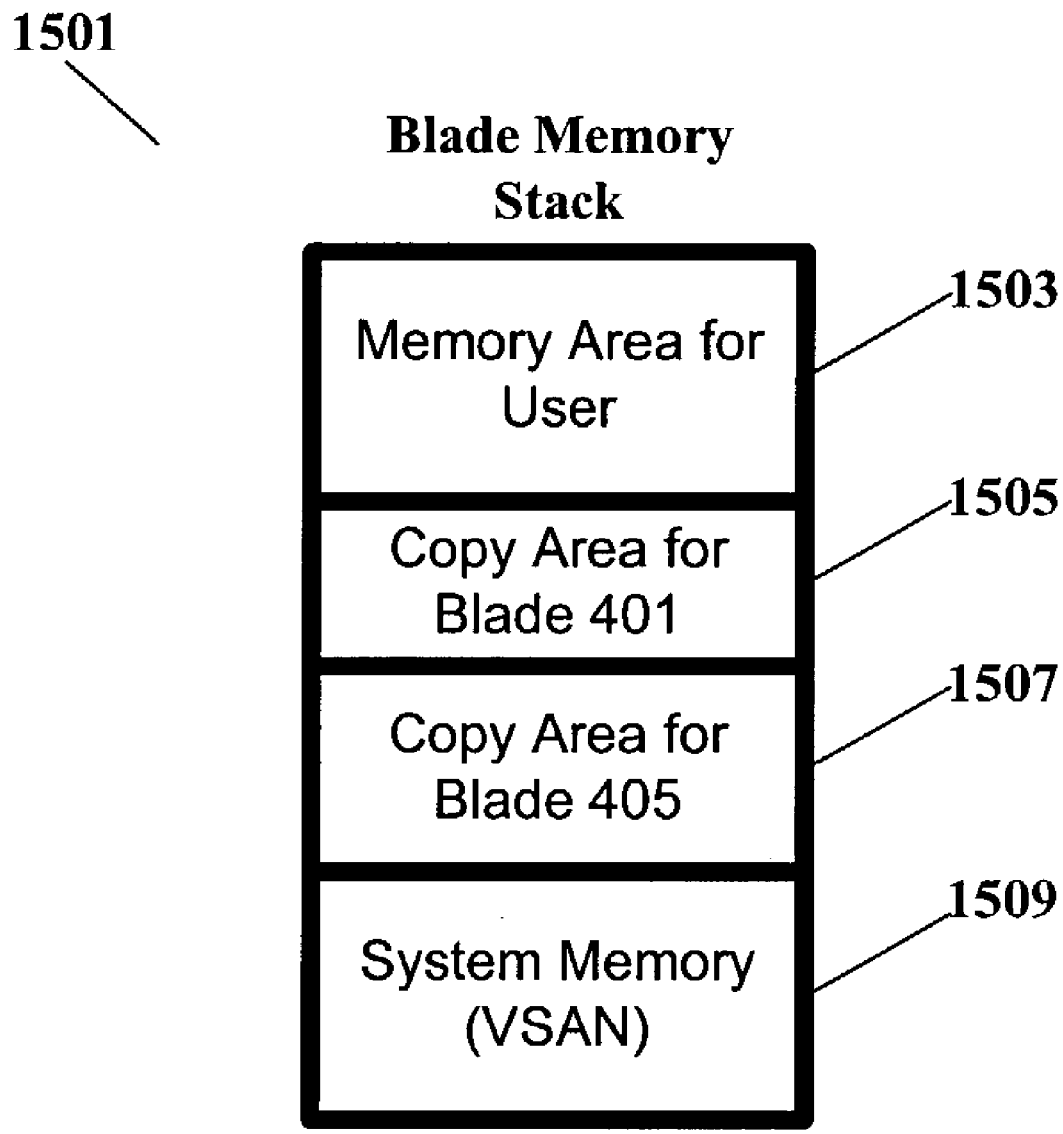
FIG. 15 illustrates a memory stack on a computer blade storing information from other computer blades, according to one embodiment.

FIG. 15—Memory Stack for a Computer Blade

Referring to FIG. 15, an embodiment of a memory stack for a computer blade storing information from other computer blades is shown. In one embodiment, the user's computer blade, e.g., computer blade 403, and two additional computer blades, e.g., computer blades 401 and 405, may each use memory space on the hard drive 208 in the user's computer blade 403. In the embodiment shown, the memory spaces used by the blades include memory spaces 1503, 1505, and 1507, although in other embodiments, other memory spaces may be defined and used. In addition, as FIG. 15 indicates, there may be additional memory space 1509 available for use by a virtual network attached storage (VNAS) system 1509. In one embodiment, a storage network with a storage area network server may be coupled to the computer blade 401 and 405. The storage network server may make the storage medium of computer blade 401 accessible by the processor of the computer blade 405, and to make the storage medium of the computer blade 405 accessible by the processor of the computer blade 401. In a preferred embodiment, the organization and manipulation of the user's computer blade memory space may be such that the blade memory space does not have a single point of failure, as described below in detail. By eliminating single points of failure, the computer blades 401, 403, and 405 together may be more reliable for use in such applications as e-commerce, trading floors, and repair call centers, among others.

In one embodiment, each computer blade 401, 403, and 405 may have some file server functionality. The file server functionality may include some I/O capabilities, and may also include functionality for negotiating file write and read protocols. Communicating with the computer memory on the computer blades 401, 403, and 405 may be analogous to communicating with a standard file server attached memory. The computer blades 401, 403, and 405 may negotiate information writes similar to a file server, and order and prioritize transactions. In one embodiment, the computer blades 401, 403, and 405 may also implement striping analogous to one used by RAID (Redundant Array of Inexpensive Disks).

A fail-forward hard drive may also utilize NAS/SAN techniques. In one embodiment, the computer blades 401, 403, and 405 may operate as a distributed NAS server. For example, in one embodiment, the computer blades 401, 403, and 405 may utilize unused memory space in a manner analogous to that used by NAS and SAN, and may also track the location of hardware and information in the system. In one embodiment, a virtual NAS (VNAS) system may be implemented where the NAS server software is distributed across the peer computer blades 401, 403, and 405 (and/or other computer blades) in the network, thereby eliminating the NAS server as a point of failure. In one embodiment, each of the computer blades 401, 403, and 405 may maintain a copy of the NAS server software. In one embodiment, the computer blades 401, 403, and 405 may store the NAS server software and may be able to transfer a copy of the software to one of the remainder of the computer blades 401, 403, and 405 in the event of a failure of a computer blade 401, 403, or 405. As mentioned above, the computer blades 401, 403, and 405 may also use computer blades 401, 403, and 405 (i.e., each other) for other software storage, as desired.

As described in detail above, when a hard drive or computer blade fail-over condition occurs, failure management software may execute to rebuild the hard drive contents on a replacement hard drive, and replace the failed computer blade in the network with a replacement computer blade. In one embodiment, the failure management software may route information reads and information writes from and to the failed hard drive to the replacement computer blade such that the user may not be aware of a failure. In one embodiment, the failure management software may execute on a central management server, optionally with a backup server in case of failure, although this approach may still present critical points of failure. In a preferred embodiment, the failure management software may be distributed over the computer blades 401, 403, and 405, such that the entire storage management system is distributed, i.e., decentralized to eliminate single points of failure. Thus, in this embodiment, the computer blades 401, 403, and 405 may not need a central server. In one embodiment, the systems and methods described herein may be used to augment an existing NAS and SAN distributed hard drive system.

In one embodiment, the VNAS system may implement an algorithm for a data fail-over system. The VNAS system may be operable to couple computer blades 401, 403, and 405 to the VNAS system, and to configure a resource manager. The computer blades 401, 403, and 405 may also be coupled to an enterprise network. The resource manager may be operable to manage the VNAS system, including information writing and striping protocols. In one embodiment, the resource manager may be located on one of the computer blades 401, 403, and 405 coupled to the VNAS system. In another embodiment, a copy of the resource manager may operate on each of the computer blades. In yet another embodiment, the resource manager may be distributed across the plurality of the computer blades, e.g., computer blades 401, 403, and 405. The information and other configuration information may be saved across computer blades 401, 403, and 405 in the VNAS system by the resource manager. Each computer blade 401, 403, and 405 coupled to the VNAS system may be involved in storing the information for the other computer blades 401, 403, and 405. The VNAS system may check if the computer blades 401, 403, and 405 in the VNAS system are functioning properly, and if the VNAS system determines that one of the computer blades 401, 403, or 405 has failed, may provide a replacement computer blade 501, as described above. The vital information on the failed computer blade 401, 403, and 405 may have been distributed across the computer blades 401, 403, and 405 in the VNAS system prior to the fail-over condition. The VNAS system may thus access the computer blades 401, 403, and 405 in the VNAS system to retrieve the vital information for the replacement computer blade 501. In one embodiment, by the use of resource managers, the computer blades 401, 403, and 405 may schedule efficient information storage among themselves, e.g., over respective others of the computer blades 401, 403, and 405.

Figure 16:
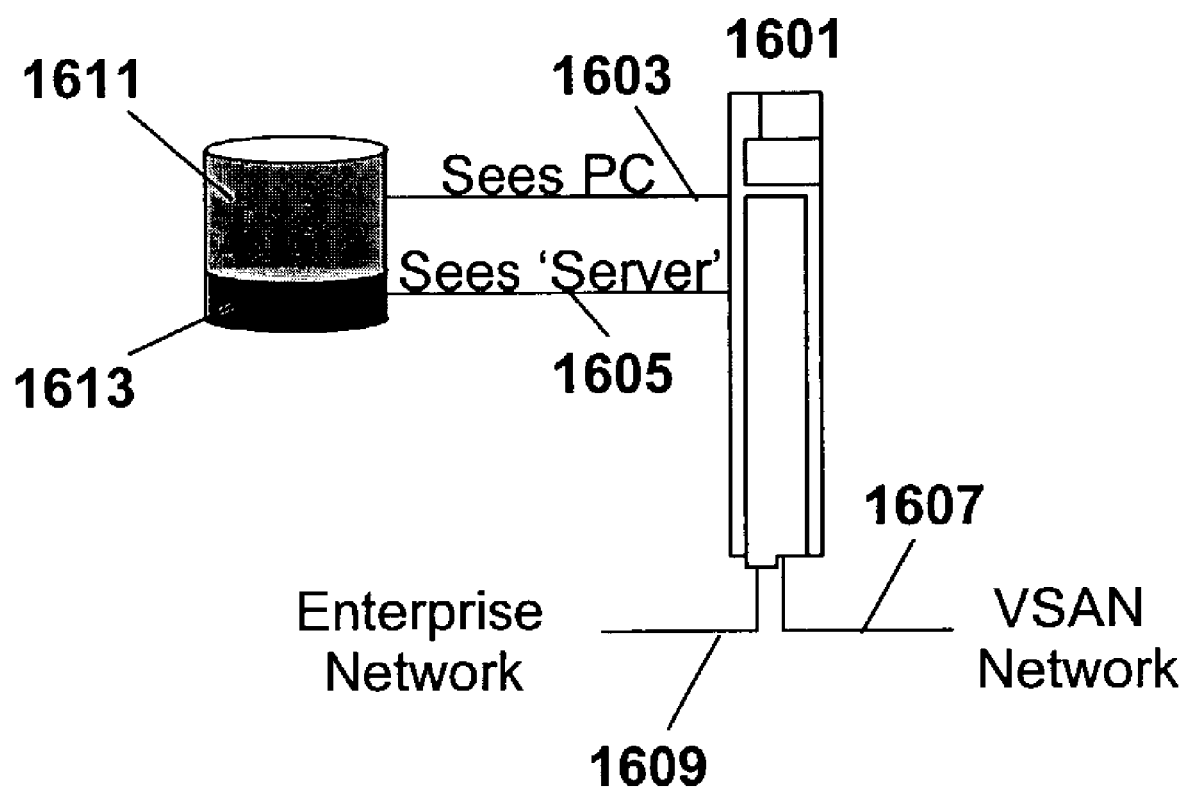
FIG. 16 illustrates a memory stack for a computer blade separated by a PC region and a Server region, according to one embodiment.

FIG. 16—Memory Stack with a PC Region and a Server Region

Referring to FIG. 16, an embodiment of a memory stack for a computer blade partitioned into a PC region 1611 and a Server region 1613 is shown. As mentioned above, in one embodiment, each computer blade 1601 may have some server functionality. The server functionality may include some I/O functionality and the ability to negotiate file write and read rules, as mentioned above. The computer blade 1601 may negotiate writes similar to a file server, and order and prioritize transactions. The computer blade 1601 may also be coupled to an enterprise network 1609 and a VSAN network 1607. Thus, in one embodiment, server functionality for the system may effectively be distributed over the plurality of computer blades, thereby removing any single points of failure associated with the user of a central server.

Figure 17:
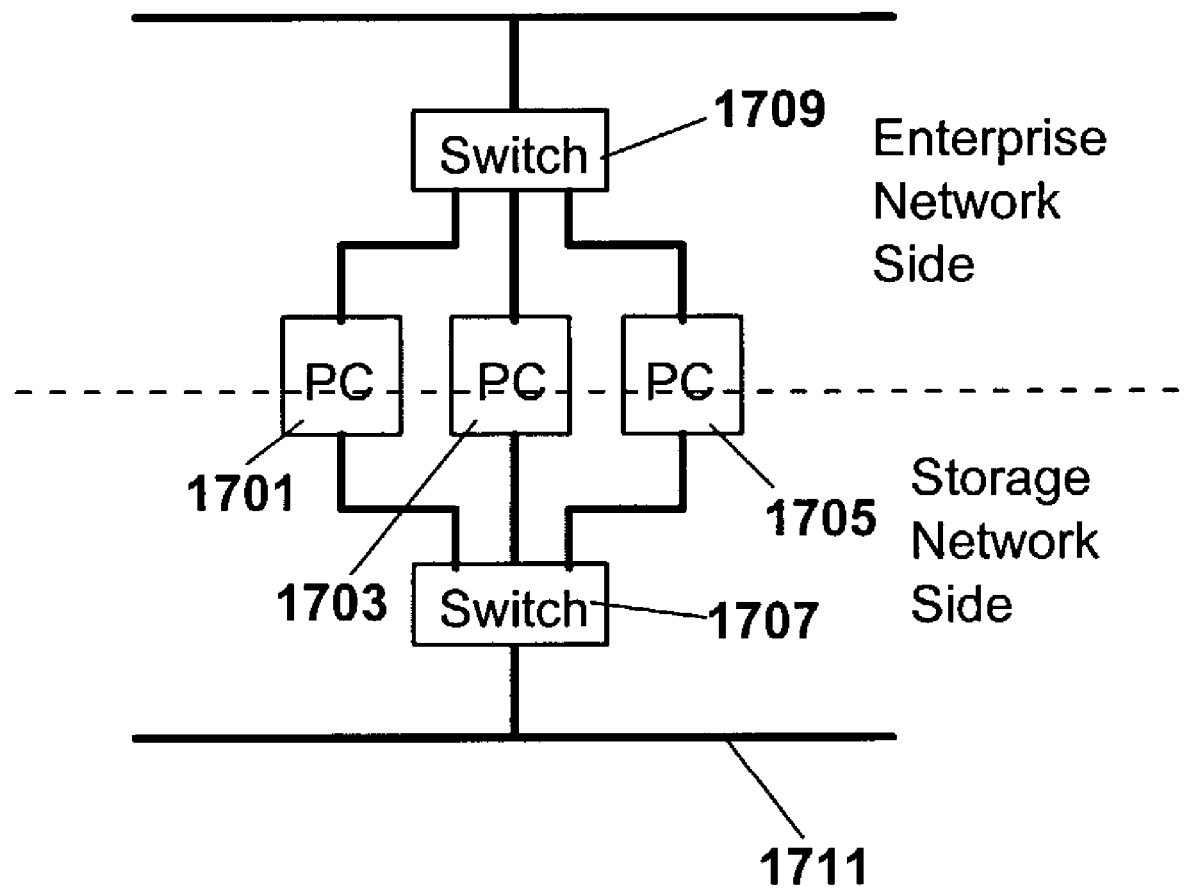
FIG. 17 illustrates an enterprise switch and a storage network switch controlling attached PCs, according to one embodiment.

FIG. 17—Enterprise Switch and Storage Network Switch

Referring to FIG. 17, an embodiment of an enterprise network switch 1709 and a storage network switch 1707 controlling attached PCs 1701, 1703, and 1705, which in a preferred embodiment, may be computer blades. As is well known in the art, a Network Attached Storage (NAS) device may be a group of hard disk drives that connect to a network, such as but not limited to an Ethernet. The NAS device may function like a server to implement file sharing. The NAS may allow more hard disk storage space to be added to the network without shutting down attached servers for maintenance and upgrades. As is also well known, a Storage Area Network (SAN) may be a network of shared storage devices. The SAN may make the storage devices coupled to the SAN available to servers coupled to the SAN. As more storage devices are added to the SAN, the additional storage devices may be accessible from any server in the SAN.

The NAS or the SAN may consist of multiple hard disks in a box with a system to serve the information out onto the network. The NAS or the SAN may use a central or limited distribution control and management node, e.g., a server, to keep track of file locations and to distribute files for storage.

In one embodiment of the invention, the computer blades 1701, 1703, 1705 may function as the server to form a VNAS environment 1711. The computer blades 1701, 1703, and 1705 may negotiate file write rules, file reads, and order and prioritize transactions. Storage mediums on the computer blades 1701, 1703, and 1705 may function as a standard server attached memory.

In one embodiment, the computer blades 1701, 1703, and 1705 may have an internal index of files in the form of a location file stored on other computer blades 1701, 1703, and 1705. The location file may indicate where information from various computer blades have been stored on other computer blades. The computer blades 1701, 1703, and 1705 may also store striping and write rules. Each file stored in the VNAS 1711 may have different striping rules that may be determined by the nature of the file and the expectations of a system administrator. The VNAS 1711 may use a transponder Routing Information Protocol (RIP) to disseminate files on the computer blades 1701, 1703, and 1705. The RIP may be a protocol defined by RFC 4038 that specifies how routers exchange routing table information, although other protocols may also be within the scope of the invention. Using the RIP, computer blades 1701, 1703, and 1705 may periodically exchange entire routing tables. The RIP may broadcast the name, index, and rules for a memory domain of the computer blades 1701, 1703, and 1705, where, for example, the broadcasts may occur in response to a change in the index, or to a lapse of a specified time period. To improve network performance, the files may be moved to reorganize the storage space or moved based on the frequency of use. For example, if the file is heavily used it may be moved to a "closer" computer blade in which there are fewer intervening switches, e.g., Ethernet links, between the file and a user of the file. Finally, the computer blades 1701, 1703, and 1705 may be operable to query an index for a specific (instant) update.

In one embodiment, if a computer blade, e.g., computer blade 1701, is seeking a file, the computer blade 1701 may search the computer blade's internal index. The computer blade 1701 may also send a query to another computer blade, e.g., computer blade 1703, that may be listed as a primary source of the file in the internal index. The computer blade 1701 may then access the file. If multiple computer blades attempt to access the file at the same time, the computer blade with the file may negotiate a multiple transaction session. After the computer blade 1701 accesses the file, the computer blade 1703 with the file may perform a backup according to read/write rules stored on the VNAS.

In one embodiment, the resource manager may function both as an analyzer and a controller when accessing the entire VNAS system 1711. As an analyzer, the resource manager may utilize information about the performance and use patterns of the entire VNAS system 1711. Based on the performance and use patterns, the resource manager may compute demand and usage metrics or issues (e.g., processor time, memory usage and demand, hard drive memory, and network information) as well as generate reports on the applications and links used. These patterns may be used to generate a map of the demands on the system's collective resources over time. The continually updated map may be used by the system administrator and/or the resource manager in order to perform predictive and proactive scheduling of resources to users. Other uses of the map may also be within the scope of the invention.

In one embodiment, in case of a first computer hard drive failure, the user of the first computer may not notice any downtime. In other words, as noted above, the fail-over process may be transparent to the user. The hard drives on the second and third computers may be the storage medium for the user through the VNAS so that a replacement processor only has to access the already copied information from the user's computer. In addition, the failed hard drive on the user's computer may be replaced with a new hard drive. In one embodiment, the new hard drive may be brought into the computer system, i.e., the user's computer, independently and without intervention of the user.

In one embodiment, when the participating computers in a VNAS cluster are NAS servers, VNAS allows new storage capacity, in the form of a new NAS server to be added, or existing capacity to be removed, without affecting the uptime of the VNAS volume. In this, VNAS running on NAS servers provides SAN level capabilities in the area of zero downtime while adding or removing storage, without any hardware modifications to existing NAS products.

In one embodiment, the computer blades may be additionally coupled to an external RAID system. The coupling to an external RAID system may give the computer blades more redundancy and reliability. In addition, the computer blades may also be coupled to separate NAS and SAN storage networks. A distributed VNAS storage management system may minimize or eliminate points of failure in the networked distributed computer system. At least a portion of the VNAS server software and the failure management software may be distributed over the computers in the network, reducing or removing central servers as a point of failure. In one embodiment, the distributed computer system may include a plurality of centrally located computers with respective human interfaces located remotely from the computers.

FIGS. 18-21—Move Manager Embodiments

In one embodiment, a move manager may provide the ability to undertake individual, workgroup, or department-level hardware moves. Move manager may be used when a fail-over condition is detected on a computer blade to restore the computer blade to a replacement computer blade. Move manager may also migrate an operating system, applications, and information from a user's old computer blade to a new computer blade without detecting a fail-over condition. In one embodiment, move manager may provide the ability to schedule moves to prevent network saturation during peak work hours. A scriptable interface may allow an administrator to control a move process and insert custom tasks or activities they would like to execute prior to initiating the move process, or upon the completion of a move. The move manager may also allow a system administrator to use a scriptable interface to add custom tasks to a move process. In various embodiments, the move process may include one or more of a one-to-one move, a cascading move, and a swap move, as discussed below.

Figure 18:
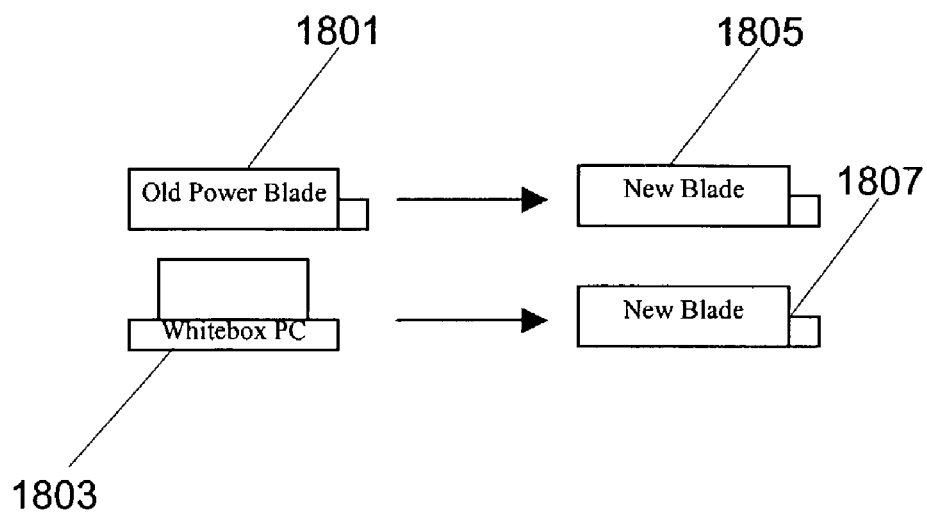
FIG. 18 illustrates a one-to-one move, according to two embodiments.

FIG. 18—A One-to-One Move

FIG. 18 illustrates a one-to-one move, according to two embodiments. In one embodiment, a single user of an existing computer, e.g., an old computer blade 1801, may be moved to new computer blade 1805. In another embodiment, a user of a legacy Whitebox PC 1803 may be moved or switched to new computer blade 1807. For example, the user may be moved for a hardware upgrade or unreliable performance of existing hardware. User preferences (such as desktop settings and icons) may be combined with other information and transferred over a network to the new computer blades 1805 and 1807 as a series of backup files (e.g., collected in archives or as "snapshots"). The backup files may be compressed packages for network transmission. In addition, a delta backup method, as discussed above, may be used.

Thus, in one embodiment, a first computer may be switched to the second computer in a one to one move by copying at least a portion of the information from the first computer to the second computer and switching the first peripheral device over to the second computer using the peripheral switch.

Figure 19:
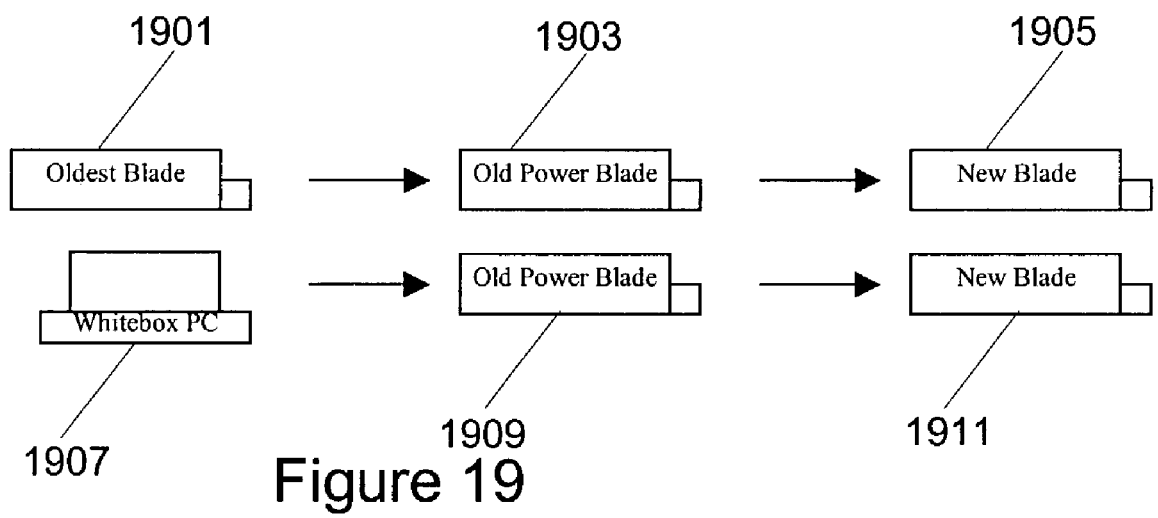
FIG. 19 illustrates a cascading move, according to one embodiment.

FIG. 19—Cascading Move

In one embodiment, a cascade move may be performed. For example, if a new powerful computer is added to the network, multiple users may be upgraded to computers more powerful than their currently assigned machines, e.g., based on computation needs, seniority, etc., where, for example, user A gets moved to the new computer, user B gets moved to user A's old computer, user C gets moved to user B's old computer, and so on. Thus, in this approach, the information from the first computer (user B's old computer) may be copied to the second computer (user A's old computer) while the information from the second computer (user A's old computer) is copied onto a third computer (the new computer). A peripheral switch may switch the first peripheral (i.e., user B's human interface) over to the second computer and may switch the second peripheral (i.e., user A's human interface) over to the third computer. Other switches may also be within the scope of the invention. For example, in one embodiment, a single peripheral switch may provide switching for all of the human interfaces. Alternatively, there may be a peripheral switch per computer or human interface. In yet another embodiment, the system may include a peripheral switch for each of a number of subsets of the computers/human interfaces.

FIG. 19 illustrates an embodiment of a cascading move where pairs of old computers are upgraded, possibly in parallel. In the embodiment shown, upon the arrival of a new set of computer blades 1905 and 1911, old computer blades 1903 and 1909, may be moved to new computer blades 1905 and 1911, respectively. Computers older than old computer blades 1903 and 1909, such as computer blade 1901 and legacy Whitebox PC 1907, may be moved onto the old computer blades 1903 and 1909, respectively. Other computers may also be within the scope of the invention.

Thus, for each upgrade path or series shown, a cascading move may be managed between a first computer, a second computer, and a third computer. In one embodiment, a copy of at least a portion of the information from the first computer may be copied onto the storage medium of the second computer. Information from the second computer may be copied onto a third computer. The peripheral switch may route signals from the first peripheral device to the second computer and from the second peripheral device to the third computer. Of course, in other embodiments, a cascading move may be performed for more than three computers.

FIG. 20—Swap Move

In one embodiment, a fail-over condition may include an indication of a need to swap the first computer with the second computer, e.g., to improve performance for a user, or to change environments (e.g., from Microsoft Windows to Apple MacOS). For example, if the second computer is a higher performing computer, and the user of the first computer needs more computational power than the user of the second computer, the computers assigned to each user may be swapped. In other words, the first computer (or another computer) may copy the information from the first computer over to the second computer, and the second computer (or another computer) may copy the information from the second computer onto the first computer. Similarly, a peripheral switch may swap the human interfaces for the respective computers, e.g., by routing signals from a first peripheral device (originally routed to the first computer) to the second computer, and from a second peripheral device (originally routed to the second computer) to the first computer.

Figure 20:
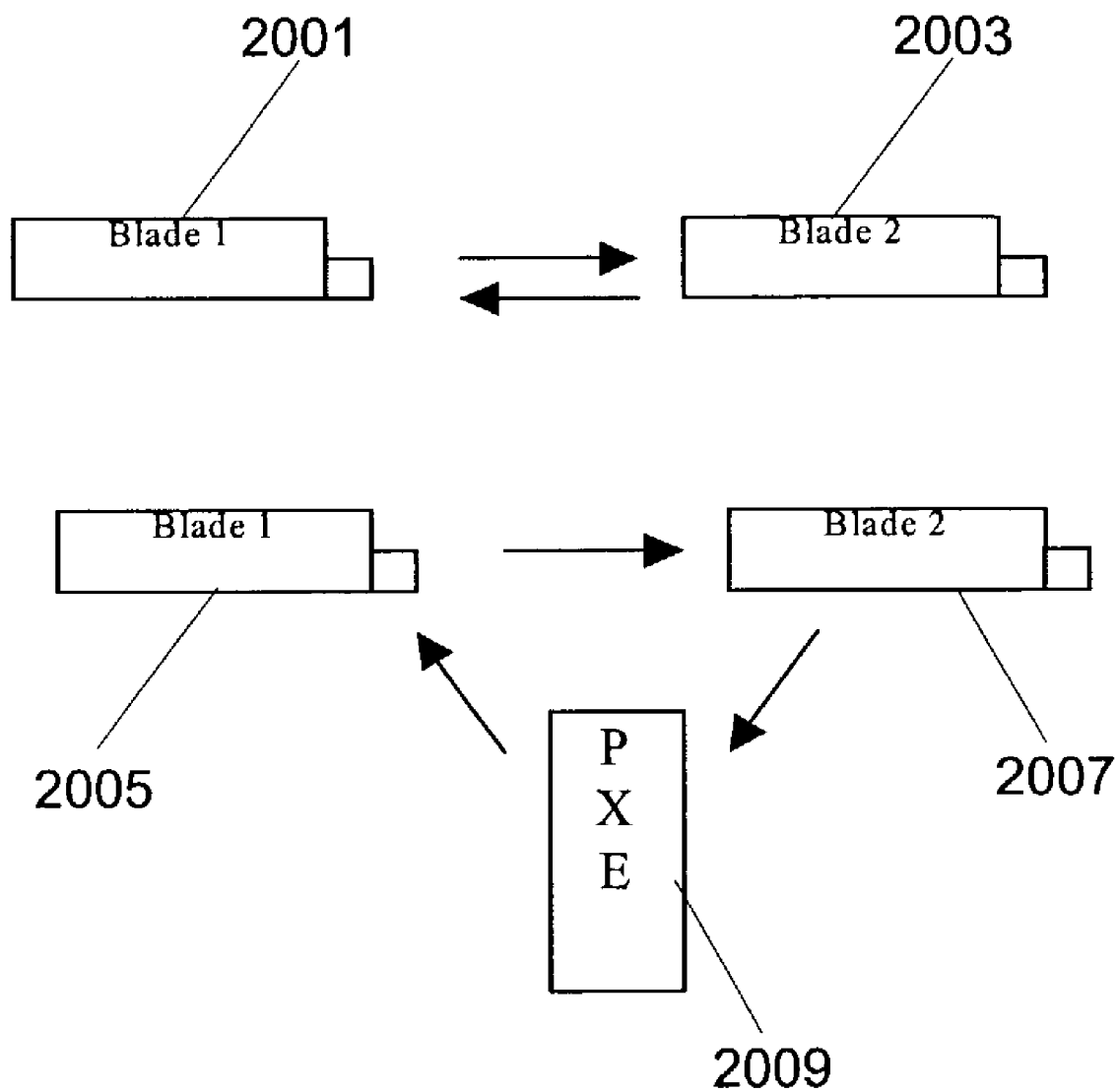
FIG. 20 illustrates a swap move, according to one embodiment.

FIG. 20 illustrates a swap move, according to one embodiment. As mentioned above, a swap move may be used to equalize or adjust the use of resources in a network (e.g., to put more demanding users with faster computer blades). The computer blades may be switched by two users, such as computer blades 2001 and 2003. Information, such as, but not limited to, applications and settings from one computer blade 2001, may be present on another computer blade 2003, post move, and vice-versa. In one embodiment, information from one of the computer blades 2005 and 2007 performing a switch, may be stored in a temporary third location to preserve the target computer blade 2007 while the switching computer blade 2005 overwrites the target computer blade's information. For example, an intermediate image server 2009 (based on PXE technology) may be used. Large-scale moves may also be within the scope of the invention. In moving multiple computer blades, moves may be scheduled for Operating System settings, profiles, applications, and user information from old computer blades to new computer blades.

In one embodiment of a swap move, at least a portion of the information from the storage medium of the first computer may be stored onto the storage medium of second computer, and at least a portion of the information from the storage medium of the second computer may be stored onto the storage medium of said first computer. The peripheral switch may switch the signal routing from the first peripheral device to the first computer to route to the second computer and the signal routing from the second peripheral device to the second computer to route to the first computer.

Figure 21:
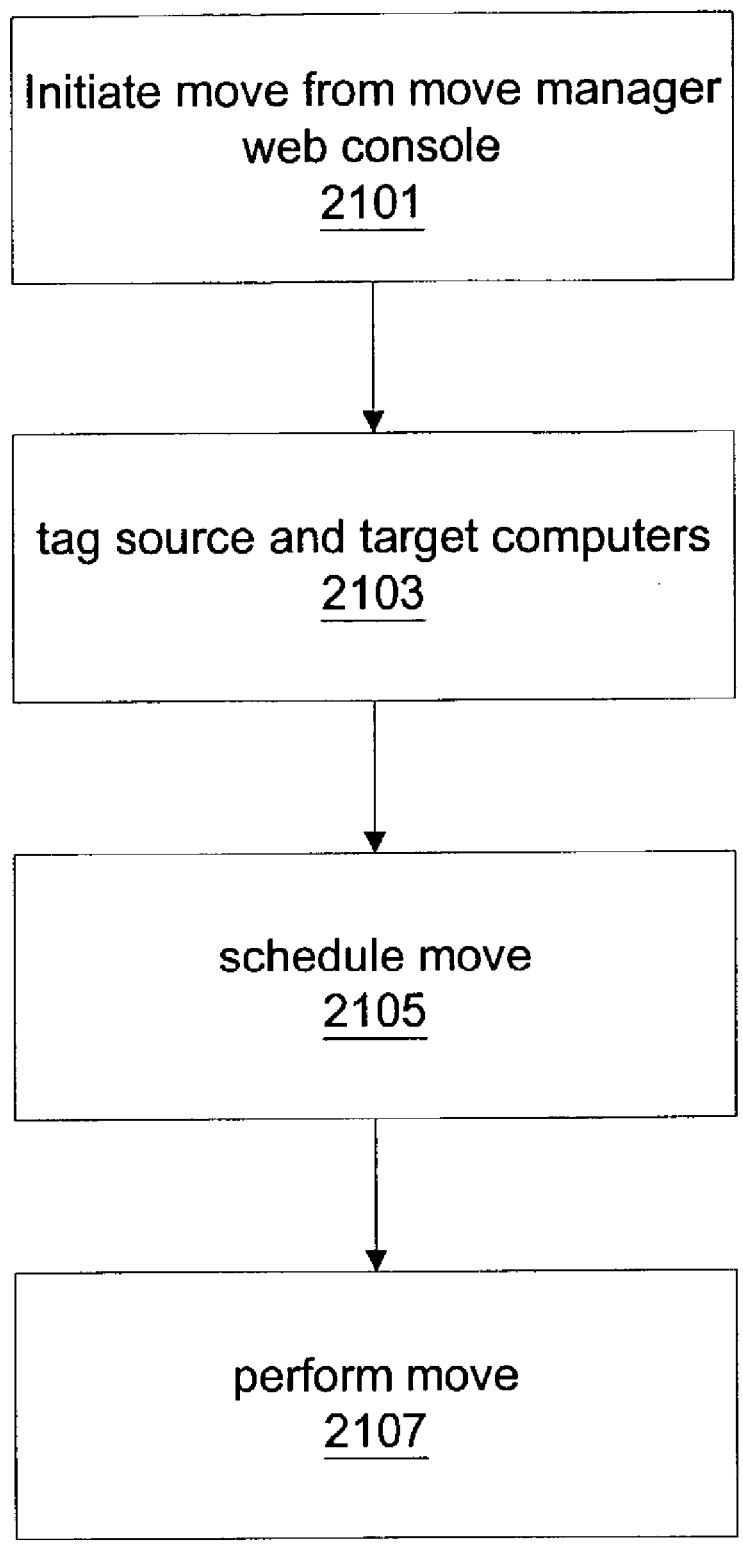
FIG. 21 flowcharts an initiation and process of a move, according to one embodiment.

FIG. 21—Flowchart of a Move Process

FIG. 21 flowcharts an initiation and process of a single computer move, according to one embodiment. It should be noted that in various embodiments of the method described below, one or more of the steps described may be performed concurrently, in a different order than shown, or may be omitted entirely. Other additional steps may also be performed as desired.

As FIG. 21 shows, in 2101, a move may be initiated, e.g., by a system administrator, or programmatically, i.e., automatically. For example, the move may be initiated as a result of one or more operation rules, or the system administrator may initiate the move from a move manager web console or other user interface.

In 2103, source and target computer blades may be tagged. In other words, one or more source/target pairs may be specified where information from each source computer is to be moved to the respective target computer, and/or one or more respective peripheral devices are to be switched from each source computer to the respective target computer.

In 2105, a move may be scheduled. Depending on the number of machines being moved, a schedule may be set to activate an image/backup process and move process at night to avoid any network saturation or other inconveniences during the work day.

Finally, in 2107, the scheduled move may be performed. In other words, at least a portion of the information from the source computer may be moved to the target computer, and any peripheral devices comprised in the human interface for the source computer may be switched to the target computer.

It is noted that any of the various moves described above (e.g., single computer switch, computer swap, and cascading move) may follow a similar process.

Various embodiments may further include receiving or storing instructions and/or information implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A data fail-over system for a plurality of computer systems, the system comprising:
   a plurality of computers, wherein each computer comprises:
      a processor; and
      a storage medium coupled to the processor;
   at least one human interface device; and
   a switch coupled to at least two of the plurality of computers, and further coupled to the at least one human interface device, wherein the switch is configured to route signals between the at least one human interface device and a first computer of the plurality of computers;
   wherein the storage medium of the first computer stores information;
   wherein the storage medium of at least one computer of the plurality of computers stores program instructions which are executable by the processor of said at least one computer to:
      copy the at least a portion of the information from the storage medium of the first computer onto a storage medium of at least one third computer of the plurality of computers;
      after said copying, monitor the first computer for a fail-over condition;
      detect the fail-over condition for the first computer; and
      in response to said detection,
         copy the at least a portion of the information from the storage medium of the at least one third computer onto the storage medium of the second computer after said detection of the fail-over condition; and
         configure the switch to switch said signal routing from the first computer to the second computer, thereby routing signals between the at least one human interface device and the second computer.

2. The system of claim 1, wherein, in copying said at least a portion of the information from the storage medium of the first computer onto the storage medium of at least one third computer of the plurality of computers, the program instructions are executable to implement a delta-based back-up scheme.

3. The system of claim 2, wherein, in implementing the delta-based back-up scheme, the program instructions are executable to:
   note each of one or more incremental backups for the first computer in a catalog;
   send the catalog to said at least one third computer, wherein said at least one third computer compares said catalog to the incremental backups stored on said at least one third computer, and wherein if said at least one third computer determines that at least one incremental backup is missing from the storage medium of said at least one third computer, said at least one third computer receives and stores said at least one missing incremental backup from said first computer.

4. The system of claim 1, wherein, in said copying at least a portion of the information from the storage medium of the first computer onto the storage medium of at least one third computer of the plurality of computers, the program instructions are further executable to periodically update said at least a portion of the information stored on the storage medium of the at least one third computer based on updated information stored on the storage medium of the first computer.

5. The system of claim 1, wherein the at least one third computer is located geographically remote from said first computer.

6. The system of claim 1, wherein said at least one third computer comprises a local computer and a remote computer, wherein the local computer is geographically local to the first computer and the remote computer is geographically remote to the first computer;
   wherein, in copying said at least a portion of the information from the storage medium of the first computer onto the storage medium of at least one third computer of the plurality of computers, the program instructions are executable to:
      if said local computer is functional, copy said at least a portion of the information from the storage medium of the local computer to said first computer onto the storage medium of the second computer after said detection, and
      if said local computer is not functional, copy said at least a portion of the information from the storage medium of the remote computer onto the storage medium of the second computer after said detection.

7. The system of claim 1,
   wherein said at least one third computer comprises a remote computer, wherein the remote computer is geographically remote to the first computer; and
   wherein, in copying said at least a portion of the information from the storage medium of the first computer onto the storage medium of at least one third computer of the plurality of computers, the program instructions are further executable to:
      copy at least a portion of information from the storage medium of an additional computer of the plurality of computers onto the remote computer.

8. The system of claim 1, wherein the program instructions are further executable to:

detect an identity of one or more of said first computer, said second computer, and said at least one third computer;

wherein said identity is used by said at least one computer to assign said one or more of said second computer and said at least one third computer to said first computer, such that said at least a portion of information from said storage medium of said first computer is stored onto said storage medium of said one or more of said second computer and said at least one third computer.

9. The system of claim 1, wherein said program instructions are further executable to:

store a replication factor for the first computer, wherein said replication factor indicates the number of other computers of the plurality of computers onto which to store said at least a portion of information from the storage medium of the first computer.

10. The system of claim 1, wherein said at least one computer of the plurality of computers comprises one or more of the first computer and the second computer.

11. The system of claim 10, wherein each of said one or more of the first computer and the second computer stores and executes at least a respective portion of the program instructions.

12. The system of claim 1, wherein said at least one computer of the plurality of computers comprises one or more of the first computer, the second computer, and a third computer of the plurality of computers.

13. The system of claim 12, wherein each of said one or more of the first computer, the second computer, and the third computer stores and executes at least a respective portion of the program instructions.

14. The system of claim 1, wherein said program instructions are executable to perform at least a subset of said storing, said monitoring, said detecting, and said configuring without human input.

15. The system of claim 1, wherein, in configuring the switch to switch said signal routing in response to said detection, the program instructions are further executable to:

indicate said detection to a human;
receive input from the human specifying said configuring; and
configuring the switch in response to said received input.

16. The system of claim 1, wherein the storage medium of at least one of the plurality of computers stores program instructions implementing a virtual storage area network.

17. The system of claim 1, wherein the storage medium of at least one of the plurality of computers stores program instructions implementing resource management software to manage one or more of processor usage, physical memory usage, hard drive usage, and network information usage for the plurality of computers.

18. The system of claim 1, wherein the storage medium of at least one of the plurality of computers stores program instructions executable to create and maintain a location file, wherein said location file indicates one or more locations of said information.

19. The system of claim 1, wherein the storage medium of at least one of the first computer and the second computer stores program instructions implementing striping rules for storing information on the storage medium of at least one of the first computer and the second computer.

20. The system of claim 1, wherein one or more of the plurality of computers comprises a respective blade computer.

21. The system of claim 1, wherein said at least a portion of the information comprises substantially all of the information stored on the storage medium of the first computer.

22. The system of claim 1, further comprising:

a human interface, wherein the human interface comprises said at least one human interface device;

wherein, in routing signals between the at least one human interface device and the first computer of the plurality of computers, the switch is operable to associate the human interface with the first computer; and wherein, after said switch, the human interface is associated with the second computer.

23. The system of claim 1, wherein each of the storage mediums of the plurality of computers comprises at least one of a random access memory module and a hard disk.

24. The system of claim 1, further comprising:

a storage network coupled to said first computer and said second computer, wherein the storage network comprises a storage area network server;

wherein the storage network server stores program instructions executable by said storage area network server to make the storage medium of the first computer accessible by the processor of the second computer, and to make the storage medium of the second computer accessible by the processor of the first computer.

25. The system of claim 1, further comprising:

a first storage medium, wherein the storage network server stores program instructions further executable by said storage area network server to make said first storage medium accessible by the processor of the first computer and the processor of the second computer.

26. The system of claim 1, wherein said program instructions are executable to perform said storing, said monitoring, said detecting, and said configuring without operation of a central server.

27. The system of claim 1, wherein the program instructions are further executable to:

detect an identity of said first computer and/or said second computer;

wherein said identity is used by said at least one computer to assign said second computer to said first computer, such that said at least a portion of information from said storage medium of said first computer is stored onto said storage medium of said second computer.

28. The system of claim 1, wherein the program instructions are further executable to implement a graphical user interface for the system;

wherein the graphical user interface comprises one or more of a login screen, a list of local computer blades, a configuration screen, a scheduling interface, an information recovery screen, an archive view screen, and an information recovery screen.

29. The system of claim 1, wherein said fail-over condition indicates a need to upgrade to a higher performance computer, and wherein said second computer is a higher performing computer than said first computer.

30. The system of claim 1, wherein said fail-over condition indicates a need to switch said first computer with said second computer.

31. The system of claim 1, further comprising:

a second at least one human interface device, wherein the switch is further coupled to said second at least one human interface device, wherein the switch is further configured to route signals between the second at least one human interface device and the second computer;

wherein the program instructions are further executable to:

copy at least a portion of the information from the storage medium of said second computer onto said storage medium of said first computer; and wherein, in configuring the switch to switch said signal routing from the first computer to the second computer, the program instructions are further executable to configure the switch to switch said signal routing from the second computer to the first computer, thereby routing signals between the second human interface device and the first computer.

32. The system of claim 1, further comprising:
a second at least one human interface device, wherein the switch is further coupled to said second at least one human interface device, wherein the switch is further configured to route signals between the second at least one human interface device and the second computer;
wherein the program instructions are further executable to:
copy at least a portion of the information from the storage medium of said second computer onto a storage medium of a fourth computer of the plurality of computers; and
wherein, in configuring the switch to switch said signal routing from the first computer to the second computer, the program instructions are further executable to configure the switch to switch said signal routing from the second computer to the fourth computer, thereby routing signals between the second human interface device and the fourth computer.

33. A computer-implemented method, comprising:
copying at least a portion of information stored on a storage medium of a first computer of a plurality of computers onto a storage medium of at least one third computer of the plurality of computers, wherein the first computer is coupled to at least one human interface device through a switch, and wherein the switch is configured to route signals between the at least one human interface device and the first computer;
monitoring the first computer for a fail-over condition;
detecting the fail-over condition for the first computer; and in response to said detection,
copying the at least a portion of the information from the storage medium of the at least one third computer onto the storage medium of a second computer after said detection of the fail-over condition; and
configuring the switch to switch said signal routing from the first computer to the second computer, thereby routing signals between the at least one human interface device and the second computer.

34. A computer-based system, comprising:
means for copying at least a portion of information stored on a storage medium of a first computer of a plurality of computers onto a storage medium of at least one third computer of the plurality of computers, wherein the first computer is coupled to at least one human interface device through a switch, and wherein the switch is configured to route signals between the at least one human interface device and the first computer;
means for monitoring the first computer for a fail-over condition;
means for detecting the fail-over condition for the first computer; and
means for, in response to said detection,
copying the at least a portion of the information from the storage medium of the at least one third computer onto the storage medium of a second computer after said detection of the fail-over condition; and
configuring the switch to switch said signal routing from the first computer to the second computer, thereby routing signals between the at least one human interface device and the second computer.

35. A computer-accessible memory medium comprising program instructions, wherein the program instructions are computer executable to perform:
copying at least a portion of information stored on a storage medium of a first computer of a plurality of computers onto a storage medium of at least one third computer of the plurality of computers, wherein the first computer is coupled to at least one human interface device through a switch, and wherein the switch is configured to route signals between the at least one human interface device and the first computer;
monitoring the first computer for a fail-over condition;
detecting the fail-over condition for the first computer; and in response to said detection,
copying the at least a portion of the information from the storage medium of the at least one third computer onto the storage medium of a second computer after said detection of the fail-over condition; and
configuring the switch to switch said signal routing from the first computer to the second computer, thereby routing signals between the at least one human interface device and the second computer.

36. A data fail-over system for a plurality of computer systems, the system comprising:
a plurality of computers, wherein each computer comprises:
a processor; and
a storage medium coupled to the processor;
at least one human interface device; and
a switch coupled to at least two of the plurality of computers, and further coupled to the at least one human interface device, wherein the switch is configured to route signals between the at least one human interface device and a first computer of the plurality of computers;
wherein the storage medium of the first computer stores information;
wherein the storage medium of at least one computer of the plurality of computers stores program instructions which are executable by the processor of said at least one computer to:
store a copy of at least a portion of the information onto the storage medium of a second computer of the plurality of computers implementing a delta-based back-up scheme, wherein to implement the delta-based scheme, the program instructions which are executable to:
note each of one or more incremental backups for the first computer in a catalog; and
send the catalog to at least one other computer of said plurality of computers, wherein said at least one other computer compares said catalog to the incremental backups stored on said second computer, and wherein if said at least one other computer determines that at least one incremental backup is missing from the storage medium of said second computer, said second computer receives and stores said at least one missing incremental backup from said first computer; and
wherein the program instructions are further executable to:

after storing the copy, monitor the first computer for a fail-over condition;
detect the fail-over condition for the first computer; and
in response to said detection, configure the switch to switch said signal routing from the first computer to the second computer, thereby routing signals between the at least one human interface device and the second computer.

* * * * *